(12) United States Patent
Storro et al.

(10) Patent No.: US 12,459,642 B1
(45) Date of Patent: Nov. 4, 2025

(54) AERIAL CONTAINER VALVE WITH TUBULAR DIAPHRAGM

(71) Applicant: Rotor Innovations, Inc., Sagle, ID (US)

(72) Inventors: Travis G. Storro, Sagle, ID (US); Victor D. Trotter, Fort Worth, TX (US); Richard J. Wilcox, Sagle, ID (US); Lee N. Skidmore, Sandpoint, ID (US)

( * ) Notice: Subject to any disclaimer, the term of this patent is extended or adjusted under 35 U.S.C. 154(b) by 0 days.

(21) Appl. No.: 19/080,819

(22) Filed: Mar. 15, 2025

(51) Int. Cl.
  B64D 1/16 (2006.01)
  A62C 3/02 (2006.01)

(52) U.S. Cl.
  CPC .............. B64D 1/16 (2013.01); A62C 3/0235 (2013.01)

(58) Field of Classification Search
  CPC .......... B64D 1/16; B64D 37/20; B64D 37/22; B64D 37/02; A62C 3/0228; A62C 3/0235; A62C 3/0242; A62C 3/0292; F16K 7/10; F16K 7/20
  See application file for complete search history.

(56) References Cited

U.S. PATENT DOCUMENTS

| | | | |
|---|---|---|---|
| 5,560,429 A | 10/1996 | Needham | |
| 5,829,809 A | 11/1998 | Arney et al. | |
| 6,192,990 B1 | 2/2001 | Brooke | |
| 6,688,402 B1 | 2/2004 | Wise | |
| 6,889,776 B2 | 5/2005 | Cheung | |
| 7,182,145 B2 | 2/2007 | Powers et al. | |
| 7,708,082 B2 | 5/2010 | Hail et al. | |
| 9,265,977 B2 | 2/2016 | Toeckes et al. | |
| 2005/0087651 A1* | 4/2005 | Powers | B64D 1/16 244/136 |
| 2022/0261015 A1 | 8/2022 | Coulson et al. | |
| 2024/0399182 A1 | 12/2024 | Arney | |

* cited by examiner

*Primary Examiner* — Nicholas McFall
*Assistant Examiner* — Justin Michael Heston
(74) *Attorney, Agent, or Firm* — bobharter.com; Robert J. Harter

(57) ABSTRACT

An aerial valve for a liquid container (e.g., a bag or a tank) suspended or otherwise carried by a firefighting aircraft includes an axially compressible tubular diaphragm. To open and close the valve, a motorized leadscrew raises and lowers a flow stopper relative to a discharge opening. The tubular diaphragm creates an air chamber above the flow stopper, so the full weight of the liquid in the container is not bearing down against the flow stopper. Thus, less force is needed to lift the flow stopper from its closed position, making the valve easier to open. Some examples of the aerial valve include features that make it wear resistant, easy to service, reprogram remotely, inexpensive to ship, and useful as a replacement for existing valves.

23 Claims, 18 Drawing Sheets

AERIAL CONTAINER VALVE WITH TUBULAR DIAPHRAGM

FIELD OF THE DISCLOSURE

This patent generally pertains to aircraft-suspended buckets and other aircraft supported containers typically used for firefighting and more specifically to a valve for controlling the release of a liquid from the bucket or other container.

BACKGROUND

Some aircraft, such as helicopters and airplanes, can be used for aerial firefighting. In some cases, a large flexible bag is hung from the underside of a helicopter. The bag is usually filled with water drawn from a nearby lake or other body of water. To quench a target area over which the helicopter is flying, a discharge valve at the bottom of the bag is opened to release some or all of the water onto the target area. The process can be repeated if necessary.

Alternatively, instead of a bag suspended from a helicopter, some airplanes are equipped with a tank for holding the water or other firefighting liquid. The discharge valve is mounted at the bottom of the tank and used for controlling the release of fluid.

DETAILED DESCRIPTION

FIGS. 1-27 pertain to examples of an aerial valve 10 (e.g., aerial valves 10*a-g*) for a liquid container 12 suspended or otherwise carried by an aircraft 14 (e.g., a helicopter 14*a*, a fixed-wing airplane 14*b*, a drone, etc.). The term, "aircraft," refers to any flying machine.

The liquid container 12 represents any means for holding a liquid 16. Some examples of the liquid container 12 include a bag 12*a* (FIG. 1), a fixed volume tank 12*b* (FIGS. 2, 20 and 25), an expandable tank 12*c* (FIGS. 26 and 27), a vessel, a sack, a hopper, etc. In some examples, the liquid container 12, e.g., tanks 12*b* and 12*c* are made of a generally rigid material. In some examples, e.g., the bag 12*a*, the liquid container 12 is made of a pliable material. The term, "pliable," as it refers to a sheet of material, means that the sheet of material can be loosely folded over onto itself and subsequently unfolded without leaving permanent damage to the sheet.

Figure 1:
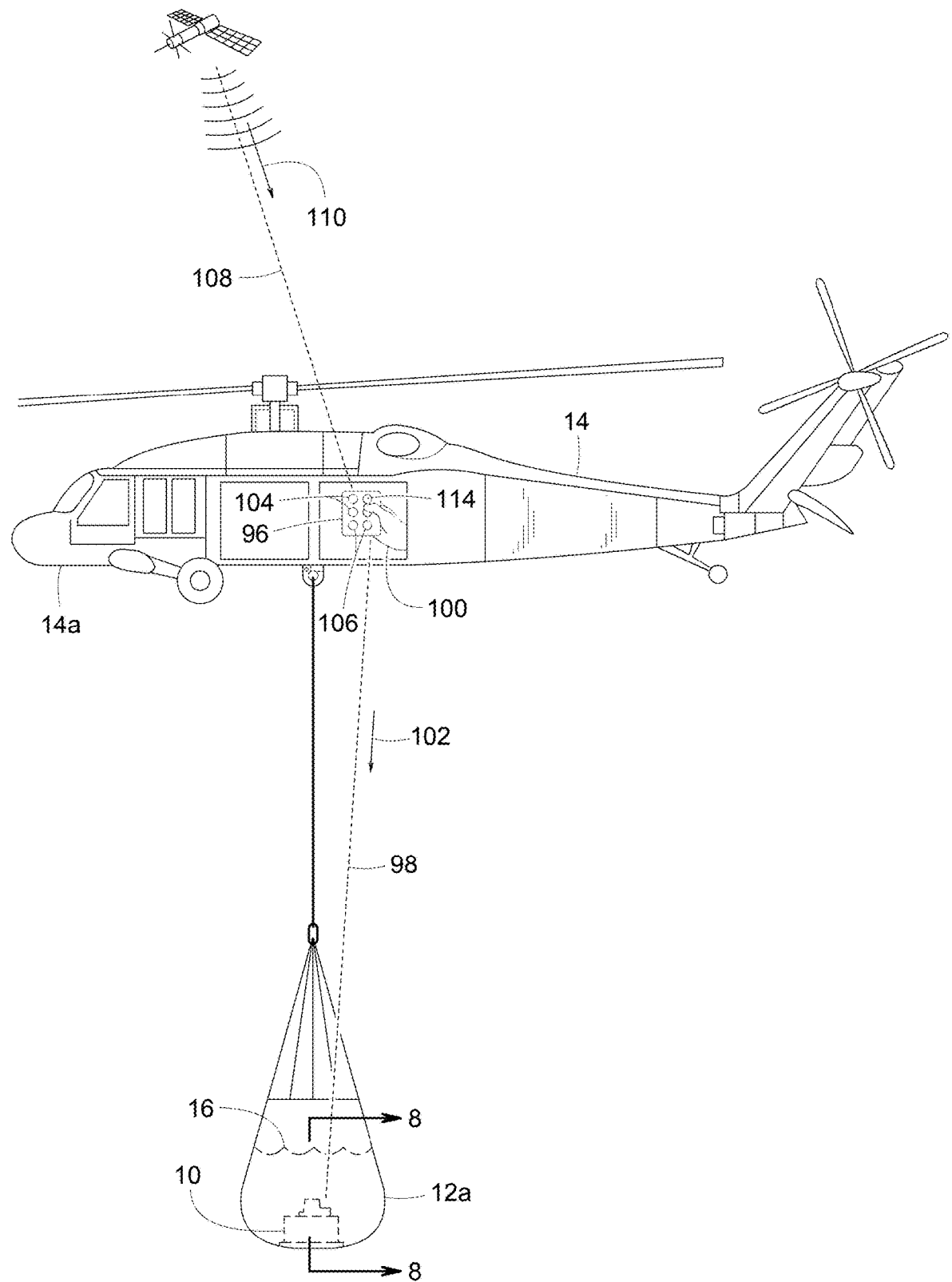
FIG. 1 is a side view showing an example aerial valve in a bag suspended from a helicopter, wherein the aerial valve is constructed in accordance with the teachings disclosed herein.
Figure 2:
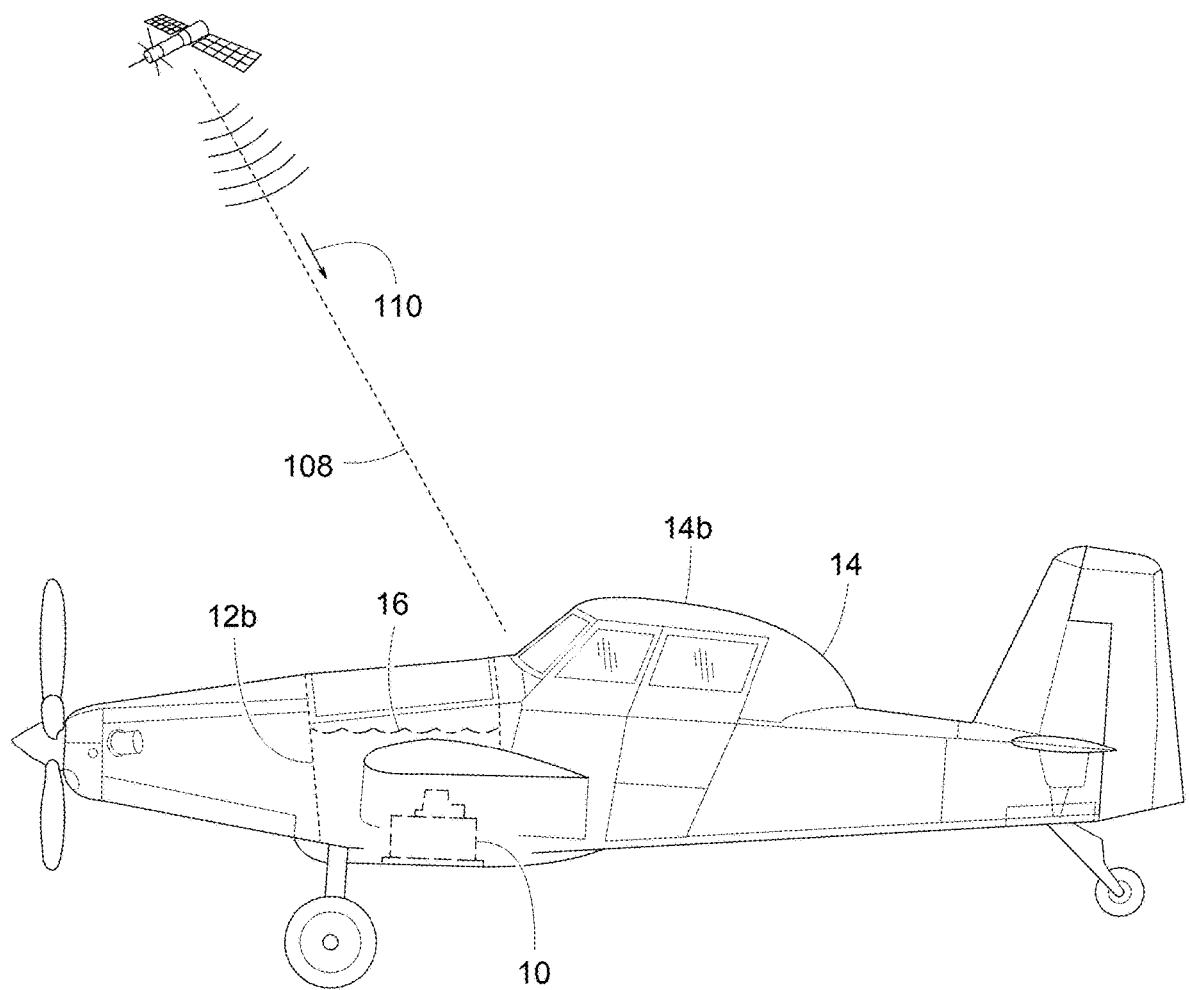
FIG. 2 is a side view showing the example aerial valve in a tank of an airplane.

FIG. 1 shows the aerial valve 10 in the bag 12*a* suspended from the helicopter 14*a*. FIG. 2 shows the aerial valve 10 installed in the tank 12*b* of the airplane 14*b*.

Figure 7:
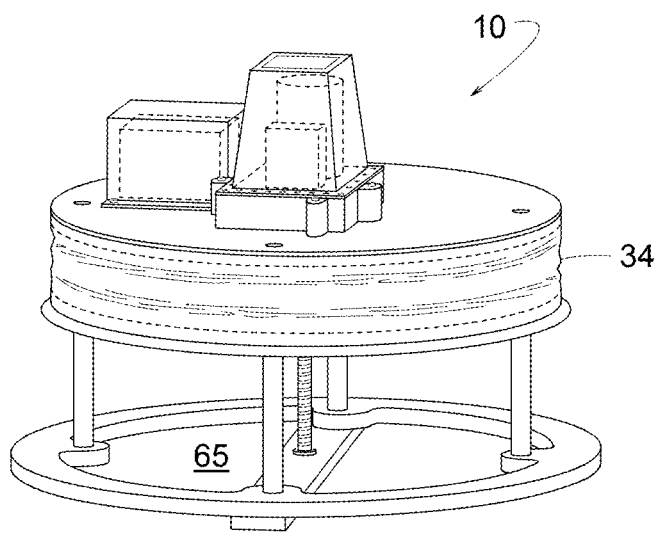
FIG. 7 is a perspective view similar to FIGS. 5 and 6 but showing the aerial valve at yet another intermediate open position.
Figure 8:
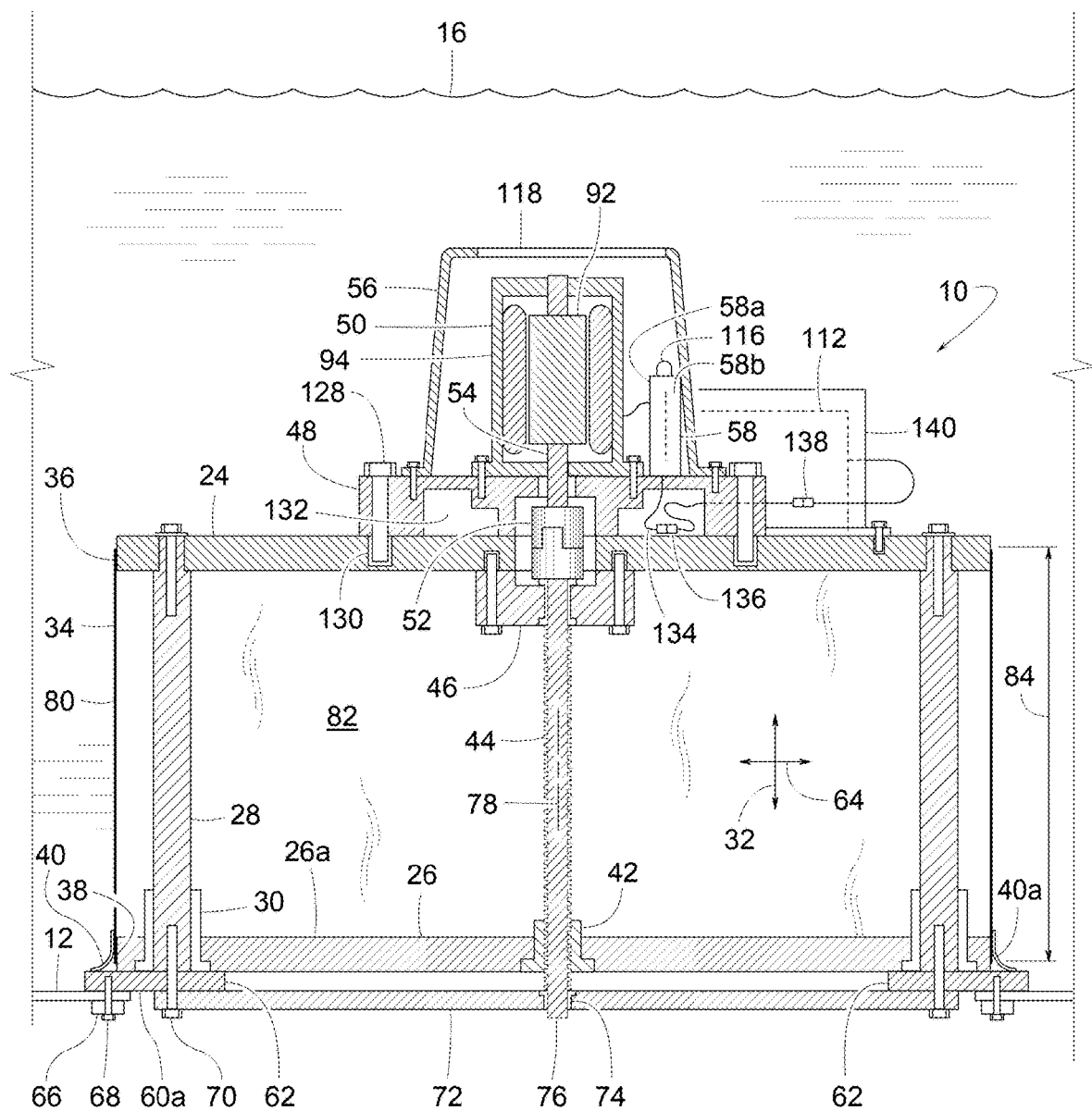
FIG. 8 is a cross-sectional view taken along line 8-8 of FIG. 1 with the aerial valve 4 installed and submerged within an example liquid container, wherein the aerial valve 4 is in the fully closed position.
Figure 9:
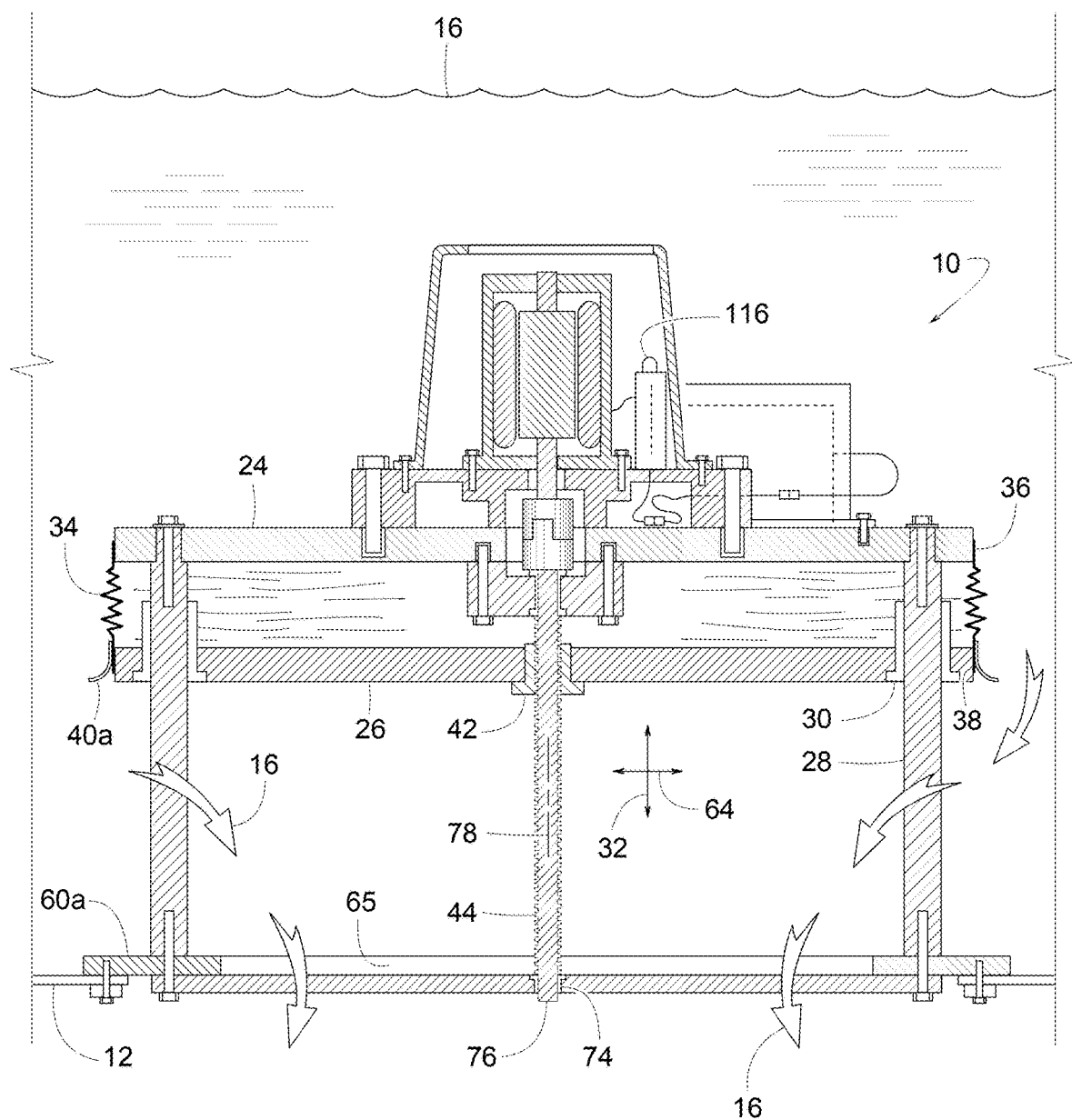
FIG. 9 is a cross-sectional view similar to FIG. 8 but showing the aerial valve in an open position.

FIGS. 3-7 show the aerial valve 10 in a fully closed position (FIG. 3), a fully open position (FIG. 4), and a plurality of discrete intermediate positions; such as a 25% open position (FIG. 5), a 50% open position (FIG. 6), and a 75% open position (FIG. 7). FIGS. 8 and 9 are cross-sectional views showing the aerial valve 10 installed within the liquid container 12 at least partially filled with liquid 16 (e.g., water, fire-retardant, and combinations thereof). FIG.

8 shows the aerial valve 10 closed to block the release of liquid 16. FIG. 9 shows the aerial valve 10 open to release the liquid 16.

Figure 10:
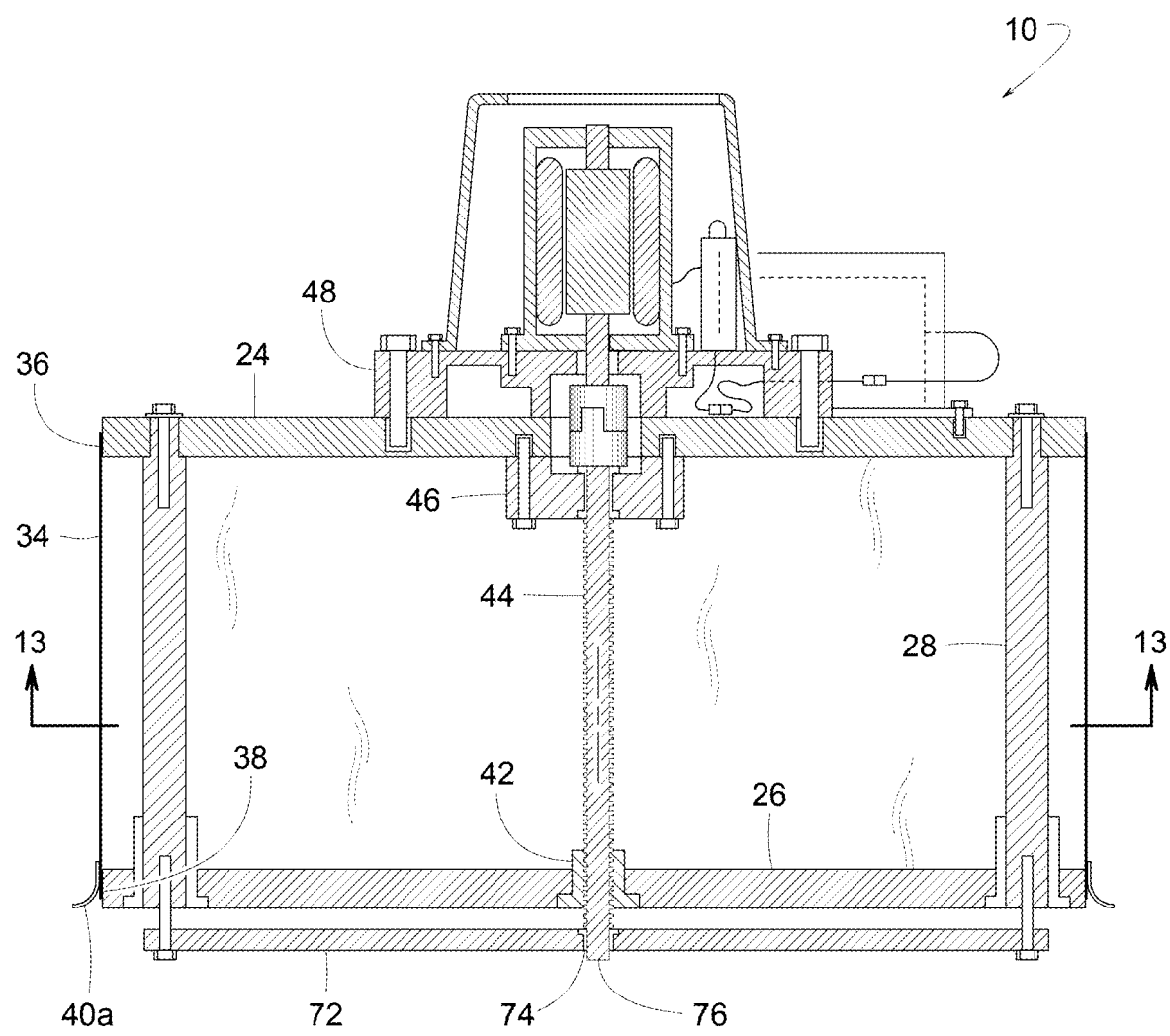
FIG. 10 is a cross-sectional view similar to FIG. 8 but showing the aerial valve separated from the liquid container.
Figure 16:
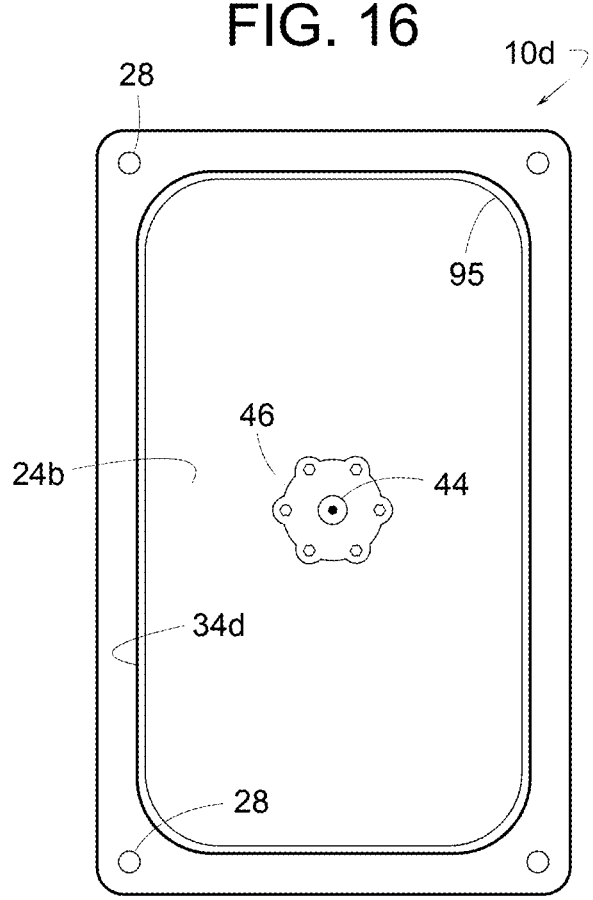
FIG. 16 is a cross-sectional view similar to FIG. 13 but showing yet another example of the aerial valve.
Figure 17:
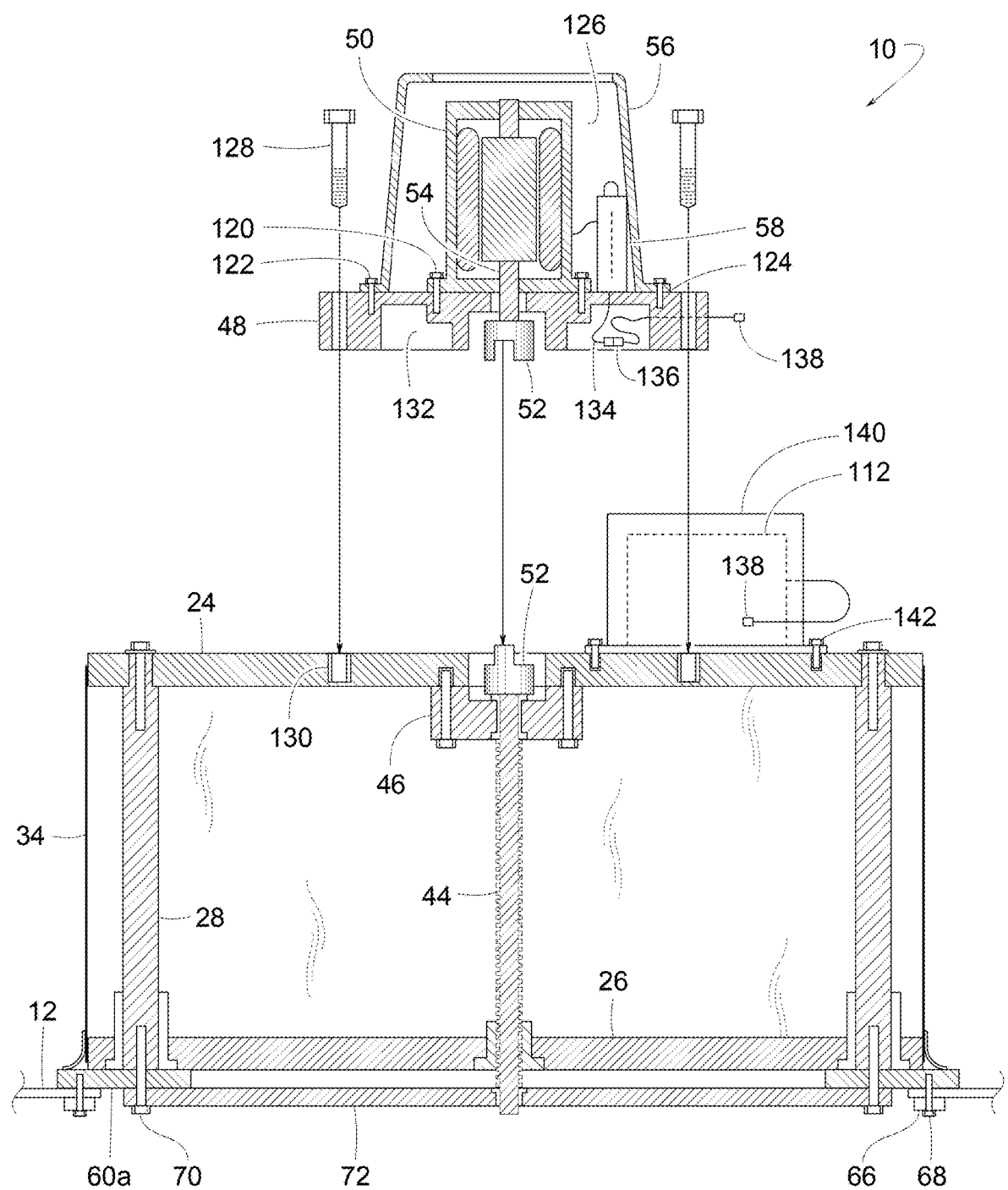
FIG. 17 is an exploded view of the aerial valve shown in FIG. 8.
Figure 18:
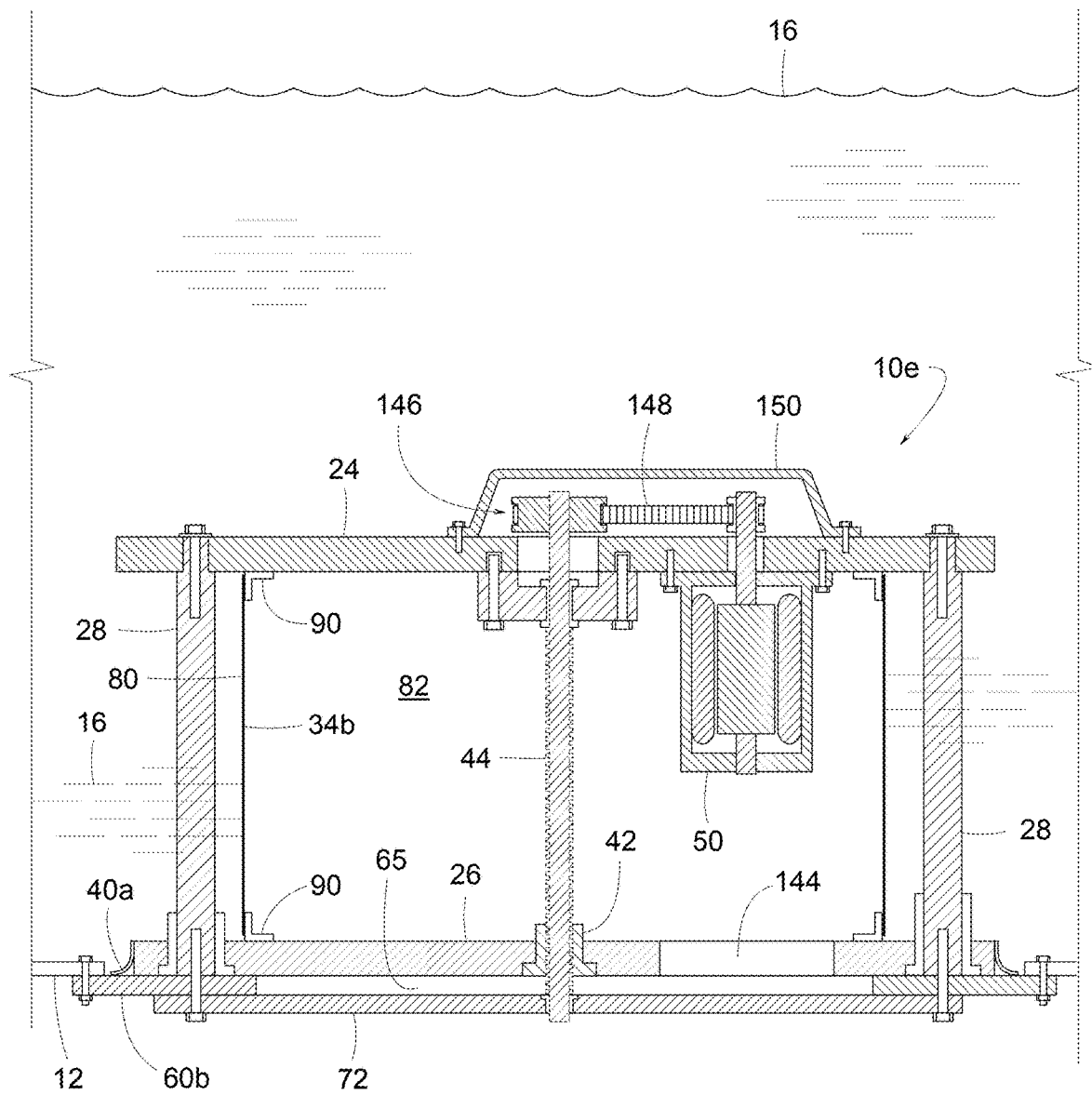
FIG. 18 is a cross-sectional view similar to FIG. 8 but showing another example of the aerial valve in its closed position and constructed in accordance with the teachings disclosed herein.
Figure 19:
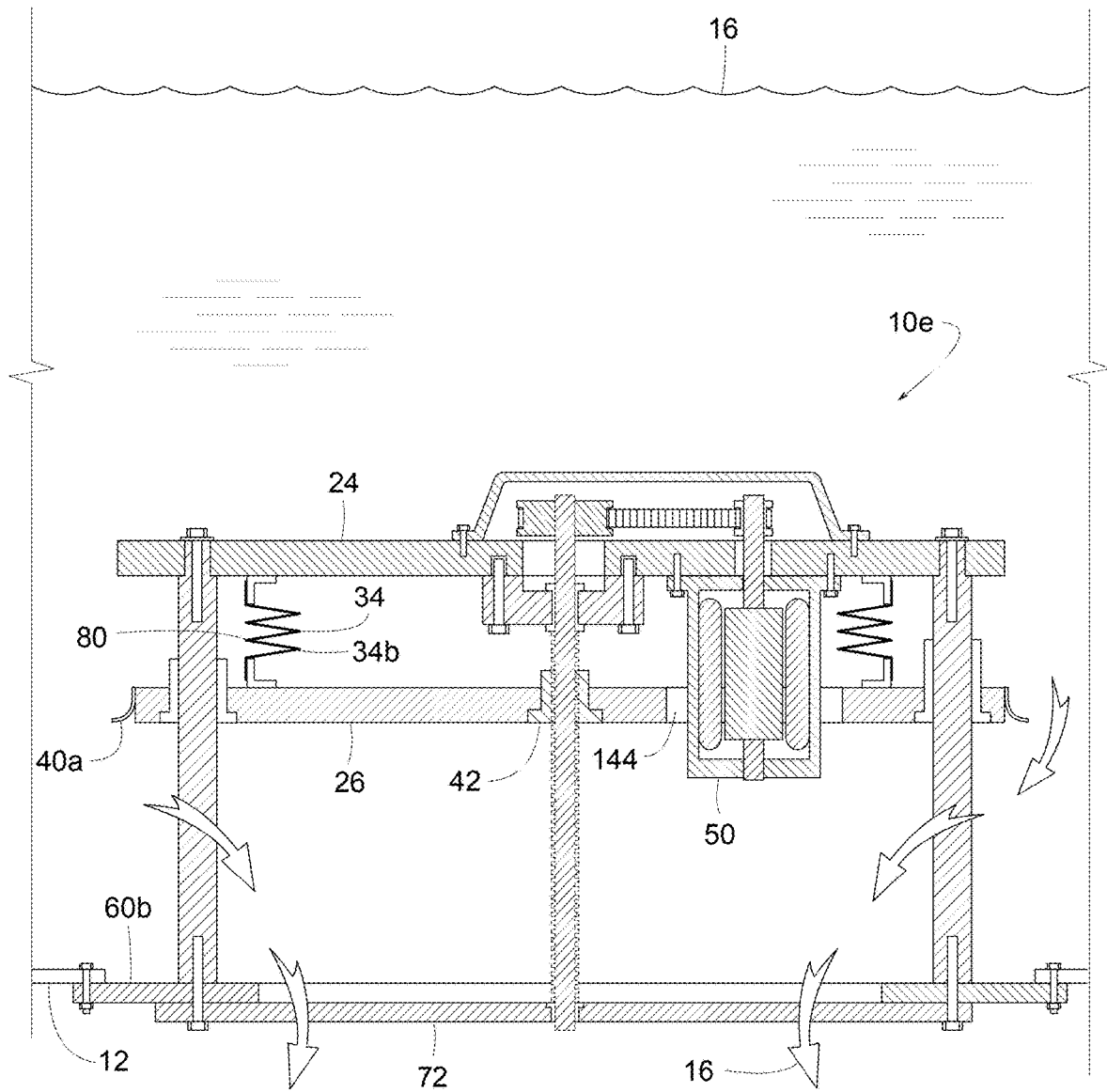
FIG. 19 is a cross-sectional view similar to FIG. 18 but showing the aerial valve open.
Figure 20:
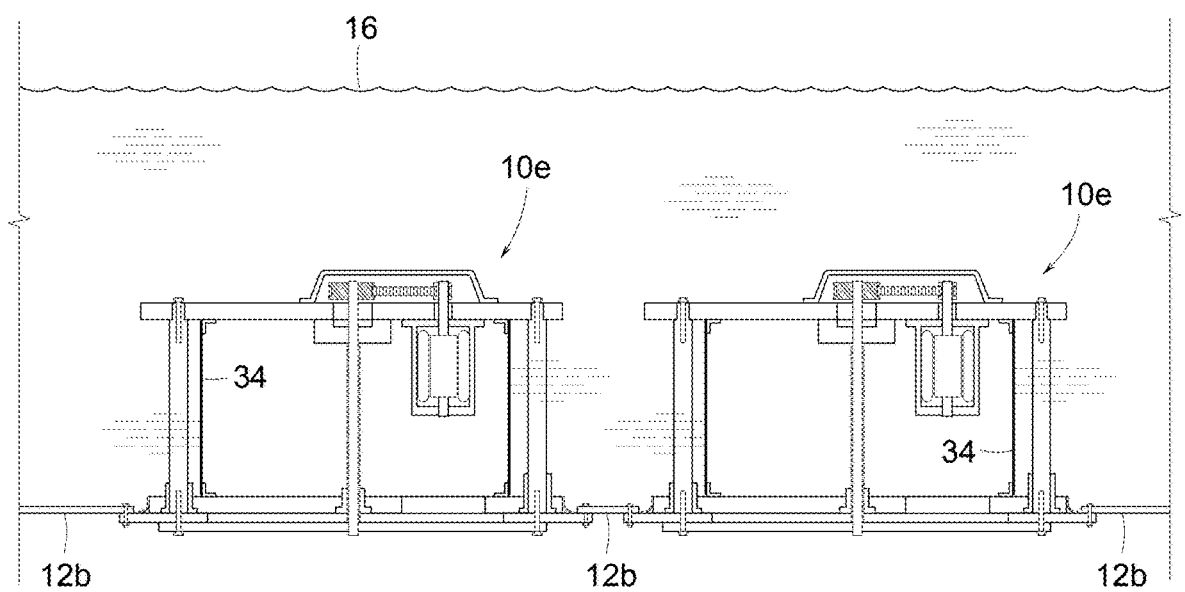
FIG. 20 is a cross-sectional view similar to FIG. 18 but showing a pair of aerial valves installed in a single liquid container.
Figure 21:
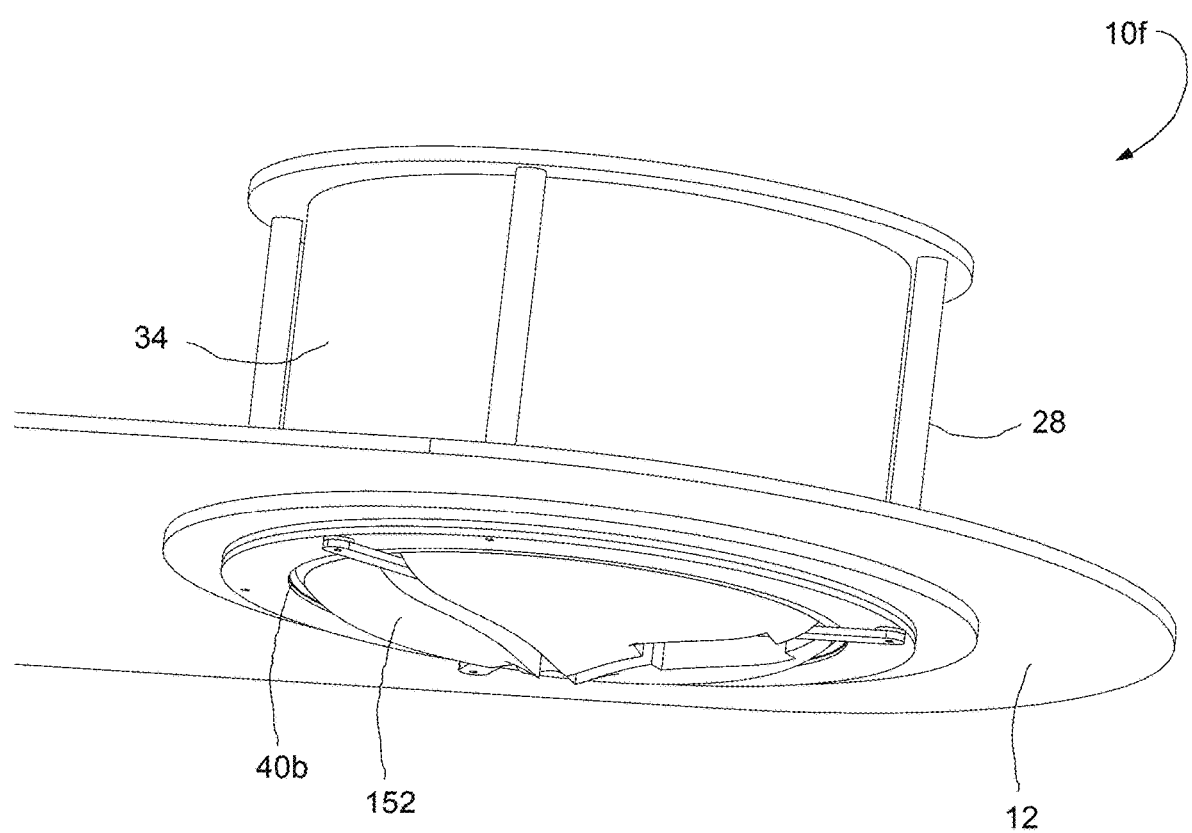
FIG. 21 is a perspective view of another example aerial valve constructed in accordance with the teachings disclosed herein, wherein the aerial valve is closed.
Figure 22:
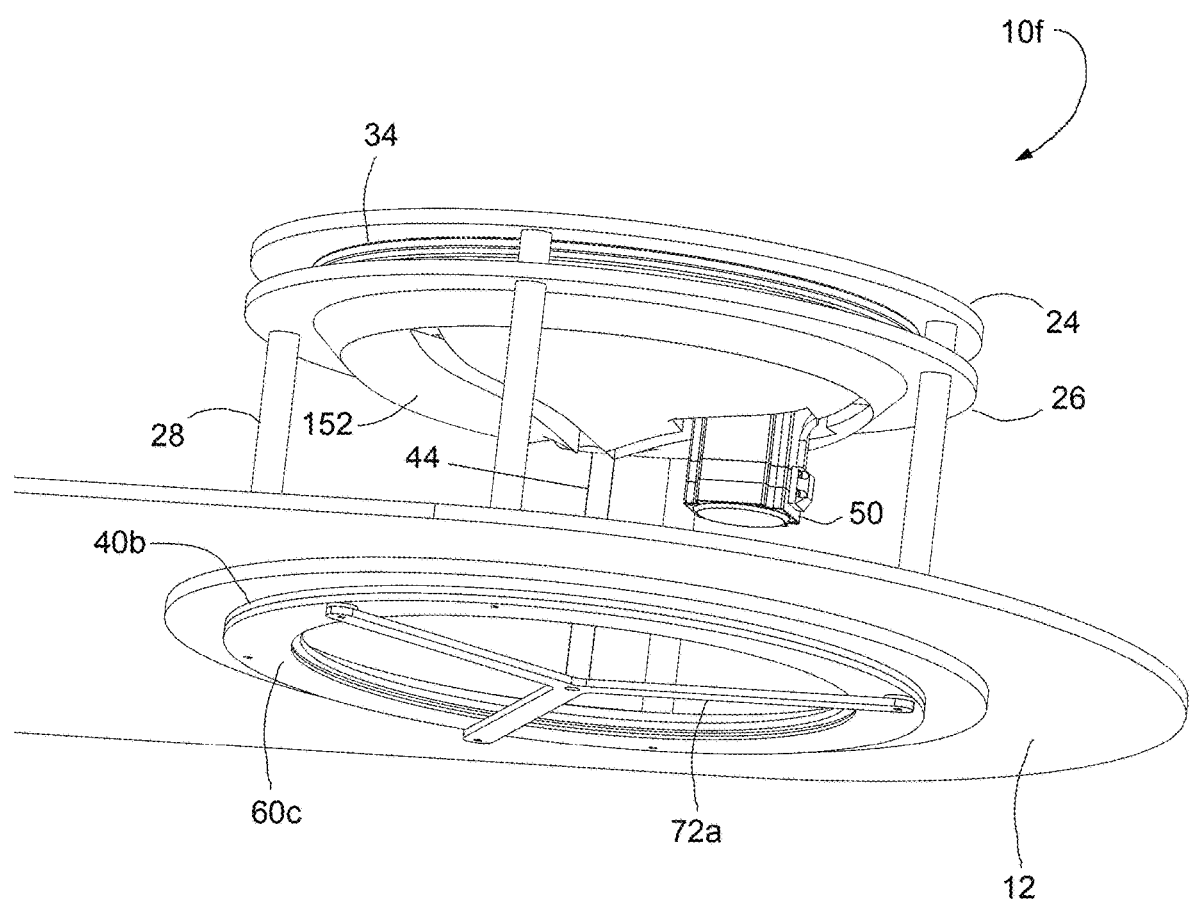
FIG. 22 is a perspective view similar to FIG. 21 but showing the valve open.
Figure 23:
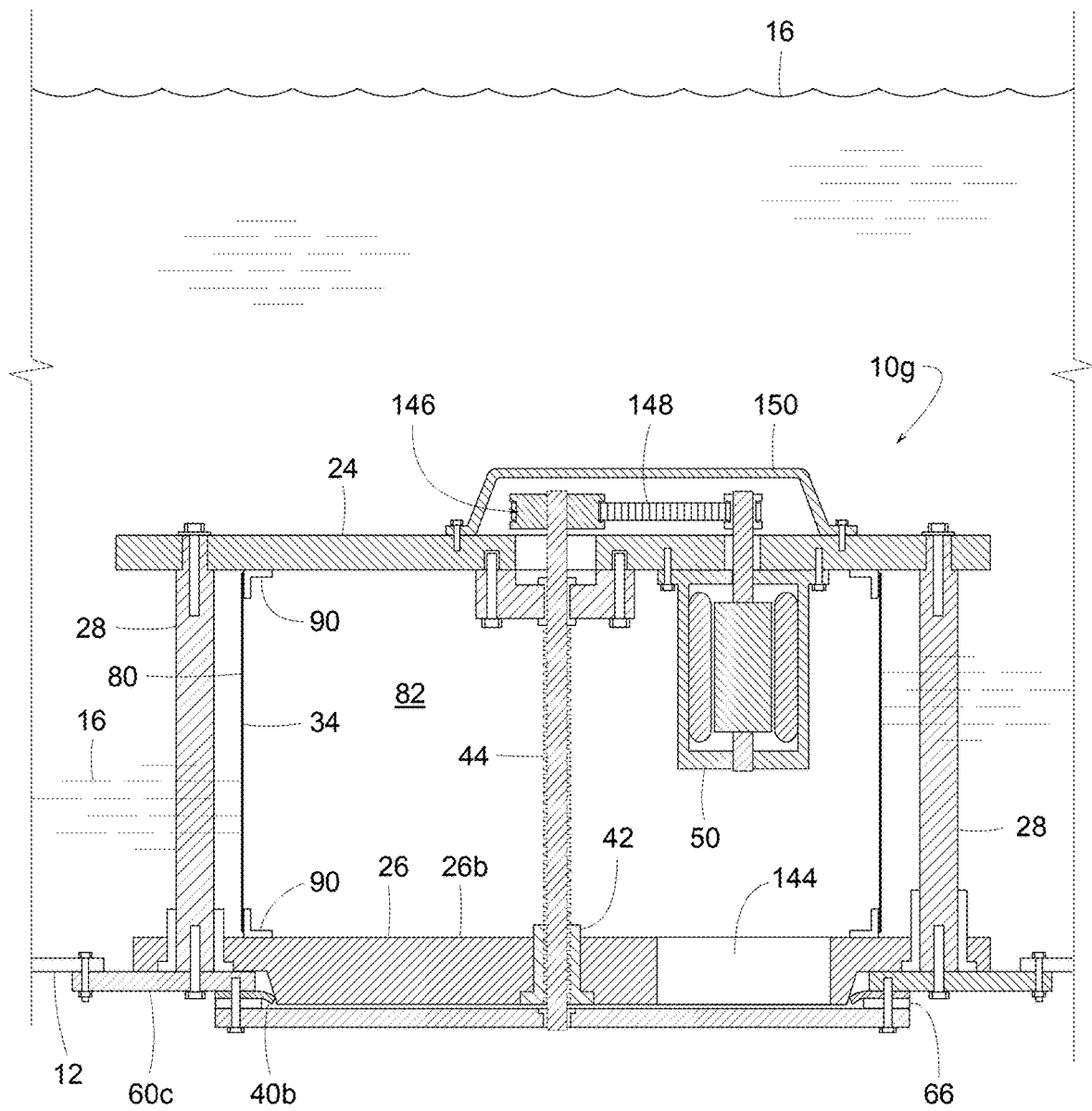
FIG. 23 is a cross-sectional view similar to FIG. 18 but showing yet another example of the aerial valve in its closed position and constructed in accordance with the teachings disclosed herein.
Figure 24:
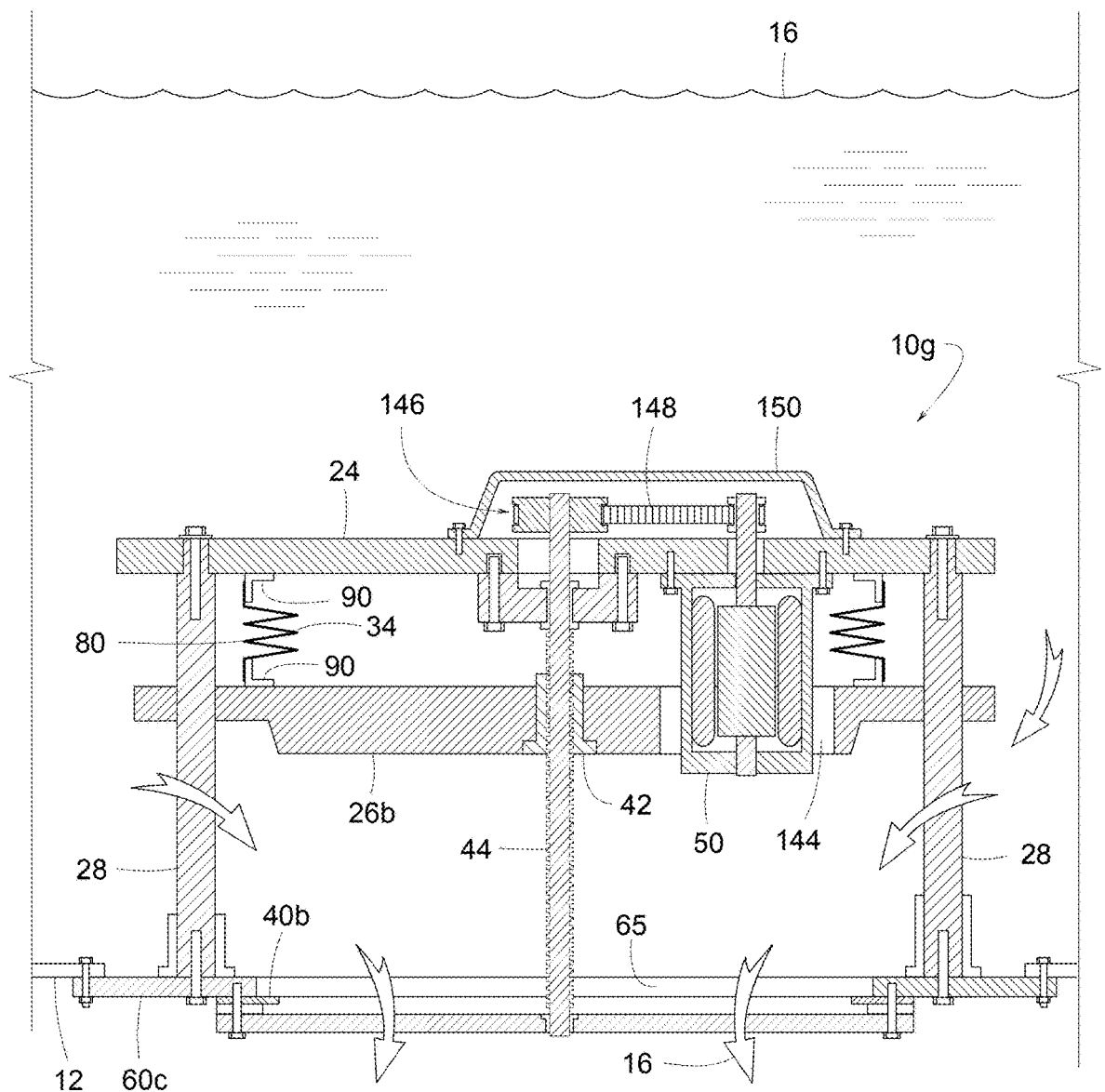
FIG. 24 is a cross-sectional view similar to FIG. 23 but showing the aerial valve open.
Figure 25:
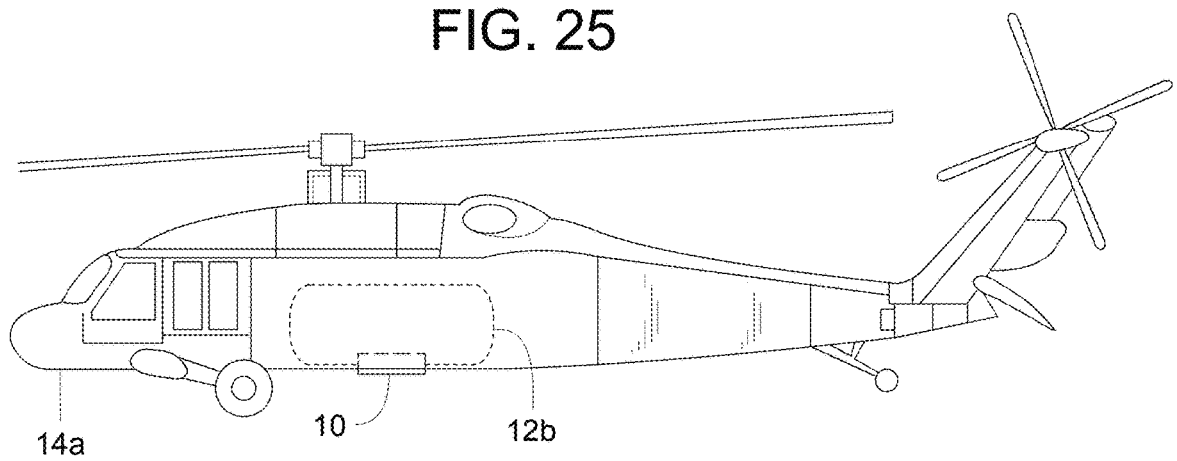
FIG. 25 is a side view showing an example aerial valve in a liquid tank carried inside a helicopter, wherein the aerial valve is constructed in accordance with the teachings disclosed herein.
Figure 26:
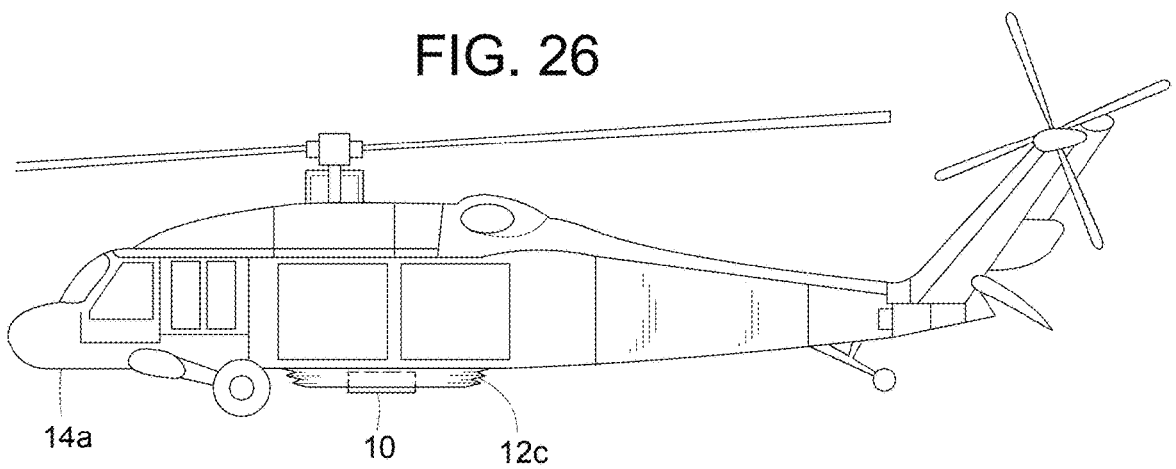
FIG. 26 is a side view showing an example aerial valve in an expandable liquid tank mounted to the underside of a helicopter, wherein expandable liquid tank is shown empty and retracted, and the aerial valve is constructed in accordance with the teachings disclosed herein.
Figure 27:
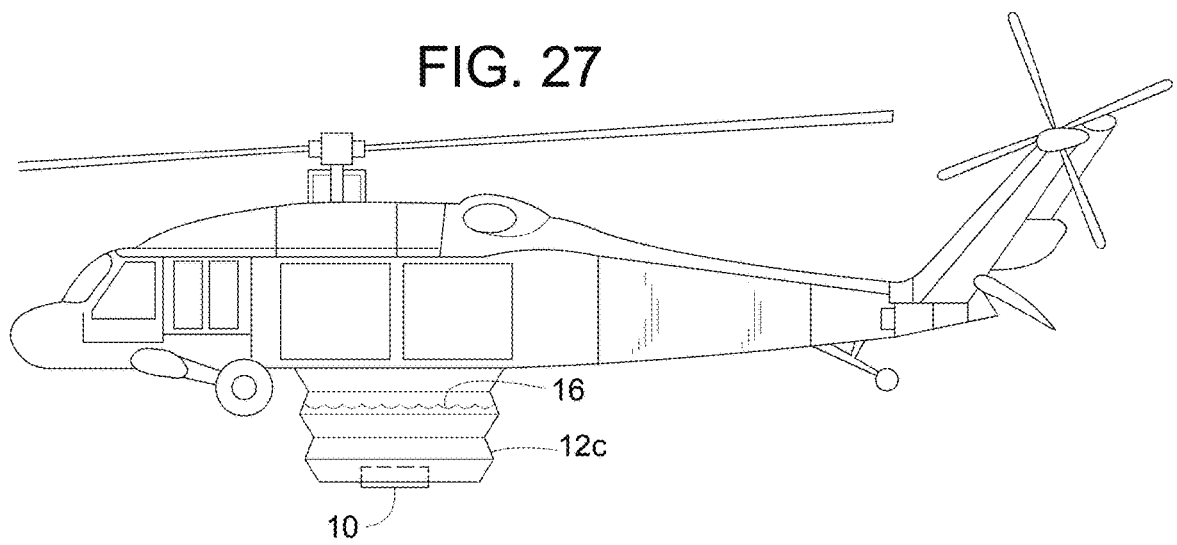
FIG. 27 is a side view similar to FIG. 26 but showing the expandable liquid tank extended by the weight of liquid in the tank.

FIG. 10 shows the aerial valve 10 alone, without the container 12. FIGS. 11-16 illustrate various design options, such as one or more circumferential stiffeners 18 and 20 (FIG. 11); protective patches 22 (FIG. 12), a configuration of the aerial valve 10a (FIG. 13), a configuration of the aerial valve 10b (FIG. 14), a configuration of the aerial valve 10c (FIG. 15), and a configuration of the aerial valve 10d (FIG. 16). FIG. 17 illustrates the aerial valve's easy disassembly means for servicing some examples of the aerial valve 10. FIGS. 18-20 show the aerial valve 10e, which is particularly suited for use in the container 12b of the airplane 14b. FIGS. 21 and 22 show the aerial valve 10f with a liquid flow conditioner 152 and an alternate seal location. FIGS. 23 and 24 show the aerial valve 10f. FIGS. 25-27 show other tank mounting configurations.

In some examples, the aerial valve 10 includes a mounting structure 60 (e.g., mounting structures 60a-c), a roof 24 (e.g., roof 24a and 24b), a tubular diaphragm 34 (e.g., tubular diaphragms 34a-d), and a flow stopper 26 (e.g., flow stoppers 26a and 26b). The mounting structure 60 is attachable to the liquid container 12 and has a liquid discharge opening 65. A plurality of guide members 28 (e.g., rods, etc.) connects the roof 24 to the mounting structure 60. The flow stopper 26, guided by the plurality of guide members 28, is movable relative to the mounting structure 60 between a lowered position (FIG. 3) and a raised position (FIG. 4), thereby configuring the aerial valve 10 respectively to a closed position and an open position. The tubular diaphragm 34 has an upper edge 36 attached to the roof 24 and lower edge 38 attached to the flow stopper 26.

The roof 24 and rigid vertical support members (e.g., guide members 28) transmit the liquid pressure forces to the lower part of the liquid container 12. The roof 24, the rigid support members (e.g., guide members 28), and the tubular diaphragm 34 act together to substantially isolate the flow stopper 26 from the pressure of the liquid 16 in the liquid container 12. The roof 24 can be of any shape. Some example roof shapes include, generally flat, pitched, hemispherical, domed, conical, and pyramidal.

The mounting structure 60 and the flow stopper 26 can also be of any shape suitable for achieving their intended purpose.

Some examples of the aerial valve 10 also include a plurality of traveling members 30 (e.g., linear bearings, etc.) attached to the flow stopper 26 and engaging the plurality of guide members 28. The plurality of traveling members 30 guide the flow stopper 26 in an axial direction 32 along the plurality of guide members 28 as the aerial valve 10 opens and closes.

Some examples of the aerial valve 10 also include an internally threaded nut 42 attached to the flow stopper 26, and a leadscrew 44 extending below the roof 24 and screwed into the nut 42 such that rotation of the leadscrew 44 moves the nut 42 and the flow stopper 26 in the axial direction 32.

Some examples of the aerial valve 10 also include a bearing housing 46 attached to the roof 24 to support the leadscrew 44, a motor base structure 48 attached to the roof 24, an electric motor 50 supported by the motor base structure 48, a disconnectable coupling 52 connecting a rotor shaft 54 of the electric motor 50 to turn the leadscrew 44, a cover 56 over the electric motor 50, and a motor circuit 58 wired to operate the electric motor 50.

Some examples of the aerial valve 10 also include a seal 40 (e.g., seals 40a and 40b) to ensure positive sealing between the flow stopper 26 and the mounting structure 60 at the discharge opening 65. Some example locations for attaching the seal 40 include on the flow stopper 26, on the lower edge 38 of the tubular diaphragm 34, and on the mounting structure 60 around the discharge opening 65.

When the flow stopper 26 is in the lowered position, the tubular diaphragm 34 is axially extended and the aerial valve 10 is in the closed position, as shown in FIGS. 3, 8, 10-12, 17, 18, 20, 21, and 23. When the aerial valve 10 is closed while attached to the liquid container 12, in some examples, the seal 40 is at the lower edge 38 of the diaphragm 34 and seals against the mounting structure 60.

To move the aerial valve 10 to a fully open position, the electric motor 50 rotates the leadscrew 44 in a forward direction. This lifts the flow stopper 26 to the raised position, as shown in FIGS. 4, 9, 19, 22, and 24. In some examples, raising the flow stopper 26 lifts the diaphragm's lower edge 38, axially shortens the tubular diaphragm 34, and lifts the seal 40 away from the mounting structure 60, all while the diaphragm's upper edge 36 is stationary. Keeping the upper edge 36 stationary as the aerial valve 10 opens prevents the tubular diaphragm 34 from protruding farther upward into the liquid container 12, thereby avoiding interference with the flow of liquid 16 within the liquid container 12.

To close the aerial valve 10, the electric motor 50 rotates the leadscrew 44 in a reverse direction. This lowers the flow stopper 26, extends the tubular diaphragm 34, and, in some examples, returns the seal 40 back down against the mounting structure 60.

Some examples of the mounting structure 60 include four lugs 62 extending inward in a radial direction 64 (perpendicular to the axial direction 32). In some examples, the plurality of guide members 28 are connectable to the liquid container 12 at the four lugs 62. In some examples, the mounting structure 60 is part of the aerial valve 10. In some examples, particularly in retrofit applications, the mounting structure 60 is part of the liquid container 12. FIG. 10, for example, shows the aerial valve 10 with the mounting structure 60 not yet installed.

To connect the aerial valve 10 to the liquid container 12, in some examples, a retainer 66 and a retainer fastener 68 clamp the liquid container 12 to the mounting structure 60. The retainer 66 is schematically illustrated to represent any means for securing the aerial valve 10 to the container 12. Some examples of the retainer 66 include a ring, a clamp, fasteners, adhesive, and combinations thereof, etc. In some examples, the retainer fastener 68, the retainer 66, and a rod fastener 70 connect the plurality of guide members 28 to the liquid container 12.

In some examples, the rod fastener 70 also connects a stabilizer bar 72 to the mounting structure 60. The stabilizer bar 72 has a lower bearing 74 (e.g., a plain sleeve bearing) that helps steady a lower end 76 of the leadscrew 44, preventing the leadscrew's lower end 76 from wobbling in the radial direction 64, particularly when the flow stopper 26 is in the raised position. The radial direction 64 is defined as being perpendicular to the axial direction 32. The axial direction 32 is defined by the leadscrew's longitudinal centerline 78 or other straight line along which the flow stopper 26 moves relative to the roof 24. In some examples, the stabilizer bar 72 is installed below the mounting structure 60 to maximize the travel distance of the flow stopper 26, thereby maximizing the opening of the aerial valve 10.

The term, "tubular diaphragm," refers to any axially flexible structure comprising an outer peripheral wall defining a hollow interior (air chamber), wherein the outer peripheral wall extends around a central axis (e.g., the longitudinal centerline 78 or parallel thereto) of the hollow interior, and the height of the outer peripheral wall, as measured parallel to the central axis, can vary by virtue of the outer peripheral wall's flexibility. In some examples, the tubular diaphragm 34 includes an outer peripheral wall 80 defining an air chamber 82, wherein the outer peripheral wall 80 extends around a central axis (e.g., longitudinal centerline 78) of the air chamber 82, and a height 84 of the outer peripheral wall 80, as measured parallel to the central axis, varies as the flow stopper 26 moves between the lowered position and the raised position.

One benefit of the tubular diaphragm 34, is that the space (air chamber 82) above the flow stopper 26 and under the roof 24 is filled with air, not liquid 16. This makes the aerial valve 10 easier to open because the aerial valve 10 does not have to open against the full weight of the liquid 16 above the flow stopper 26.

Omitting the tubular diaphragm 34, on the other hand, would allow the air chamber 82 to fill with liquid 16. As a result, the weight of the liquid 16, and actually the entire water head within the liquid container 12, would bear down against the flow stopper 26, thereby holding the flow stopper 26 shut with substantial force. If the air chamber 82 were filled with liquid 16, the electric motor 50 and the leadscrew 44 would have to exert a much greater force to lift the flow stopper 26 and open the aerial valve 10. This would require a much larger motor and thus make the aerial valve 10 heavier and less compact, and possibly even impractical for use as a battery powered bucket system (FIG. 1).

Another benefit of the tubular diaphragm 34 is that it allows the use a clearance hole (opening 144) in the flow stopper 26. The opening 144 can be used as clearance for a pump or a motor attached to the underside of the roof 24. But without the tubular diaphragm 34, the liquid 16 in the liquid container 12 could simply drain out through the opening 144, even when the aerial valve 10 is closed. So the aerial valve 10 could never really be truly closed.

Yet another benefit of the tubular diaphragm 34 is that when the aerial valve 10 is open, the tubular diaphragm's upper edge 36 does not extend above the roof 24. This prevents the upper edge 36 from interfering with the flow of the liquid 16 when the aerial valve 10 is open.

As for the actual construction of the tubular diaphragm 34, some example materials of the diaphragm's outer peripheral wall 80 include XR-5 (registered trademark of Seaman Corporation of Wooster, Ohio), EIA (ethylene interpolymer alloy), fabric reinforced polymer, 22-ounce polymeric sheet, 22-ounce fabric, PVC (polyvinylchloride), PVC fabric, synthetic fabric, natural fabric with a polymeric coating, canvas duck, rubber-impregnated fabric, coated or uncoated nylon, polyester fabric, neoprene sheering, chlorosulfonated polyethylene synthetic rubber or CSM or CSPE (also known as HYPALON, which is a registered trademark of DuPont of Wilmington, Delaware), and various combinations thereof. In some examples, the outer peripheral wall 80 is pliable, which makes the tubular diaphragm 34 compactable and thus less expensive to ship. In some examples, as shown in FIGS. 18-24, the outer peripheral wall 80 is pleated like an accordion to enhance the tubular diaphragm's axial compressibility while increasing its radial stiffness.

Figure 11:
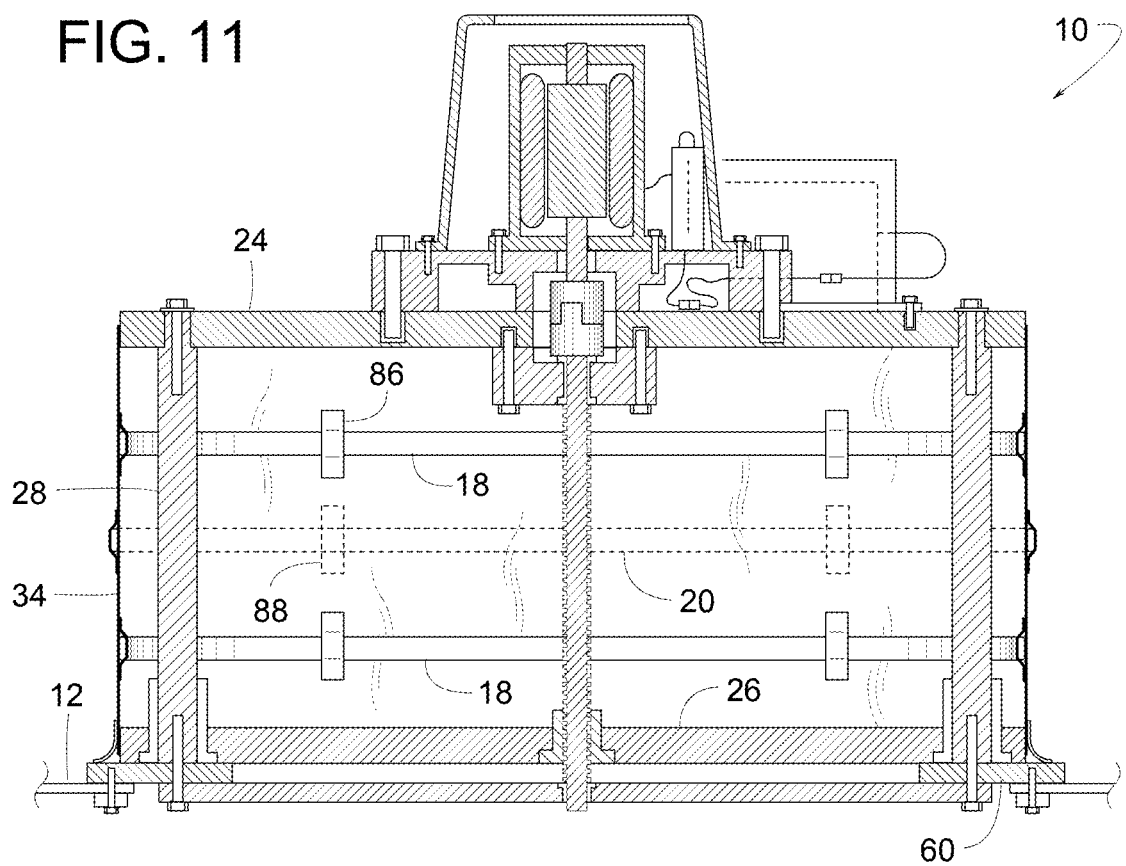
FIG. 11 is a cross-section view similar to FIG. 8 but showing the aerial valve with some additional features.

Some examples of the tubular diaphragm 34, as shown in FIG. 11, include the inner circumferential stiffener 18, such as a rod, a band, a hoop, a ring, etc. In some examples, a loop of material 86 holds the inner circumferential stiffener 18 in place. In some examples, the loop of material 86 is sewn, adhesively bonded, and/or thermally welded in place.

In addition or alternatively, some examples of the tubular diaphragm 34 include the outer circumferential stiffener 20, such as a rod, a band, a hoop, a ring, etc. In some examples, a loop of material 88 holds the outer circumferential stiffener 20 in place. In some examples, the loop of material 88 is sewn, adhesively bonded, and/or thermally welded in place. Some example materials of the inner and outer circumferential stiffeners 18 and 20 include fiberglass, plastic, metal, steel, and stainless steel.

Figure 12:
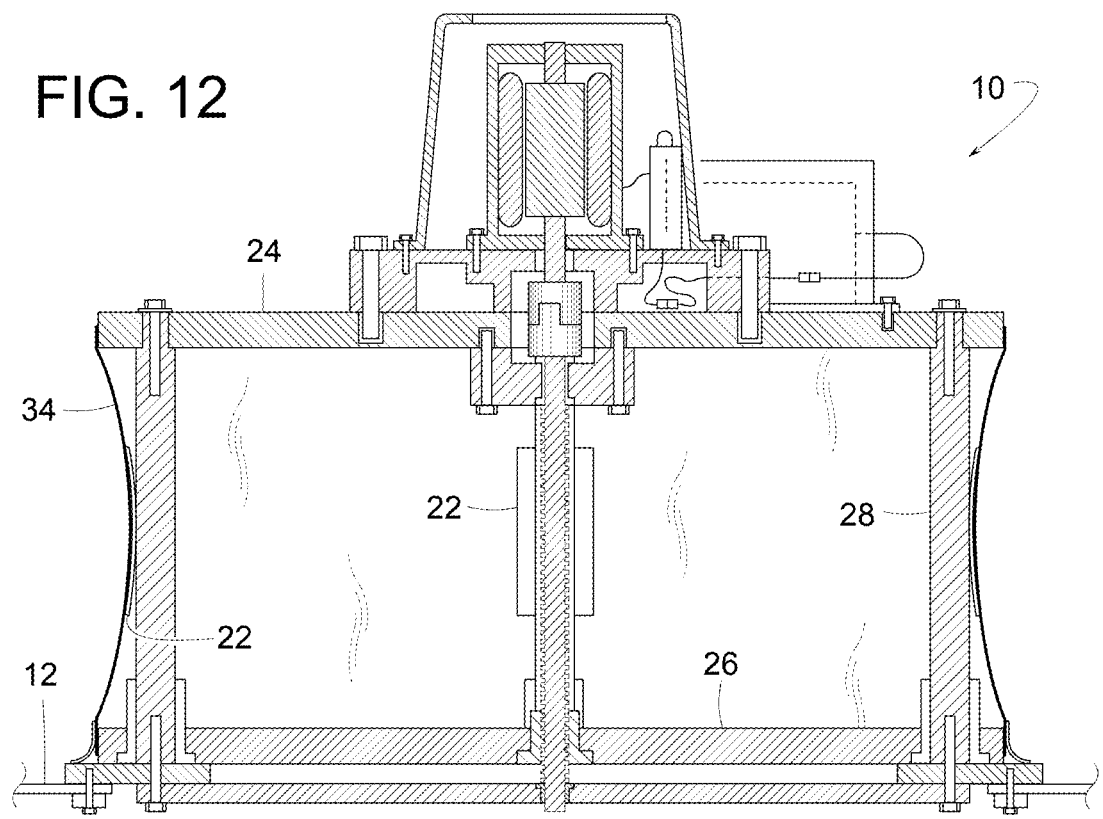
FIG. 12 is a cross-section view similar to FIG. 11 but showing the aerial valve with some other additional features.

In addition or alternatively, some examples of the tubular diaphragm 34, as shown in FIG. 12, include the protective patch 22 attached to an inner surface of the tubular diaphragm 34 and placed so as to come into sliding contact with the plurality of guide members 28 as the aerial valve 10 opens and closes. The protective patch 22 helps protect other surfaces of the tubular diaphragm 34 from wear. Some example materials of the protective patch 22 include, plastic, metal, UHMW (ultra high molecular weight polyethylene), and nylon. Example means for attaching the protective patch 22 to the tubular diaphragm include thermal welding, sewing, stapling, adhesively bonding, using a series of known fasteners, and various combinations thereof.

The upper edge 36 and the lower edge 38 of the tubular diaphragm 34 can be fastened to their respective roof 24 and flow stopper 26 by any suitable means for attachment. Some examples of such means for attachment include a constricting wire, a constricting ring, a constricting band, a constricting strap, a ratchet strap, a constricting rope, a zip tie, a belt, a hose clamp, a series of screws, an adhesive, a sealant, an annular gasket, and various combinations thereof, etc.

In some examples, as shown in FIGS. 3-13, a tubular diaphragm 34*a* of the aerial valve 10*a* extends radially beyond the plurality of guide members 28 such that the tubular diaphragm 34*a* encircles the plurality of guide members 28. This arrangement works particularly well in retrofit applications where the aerial valve 10*a* replaces a preexisting valve.

Figure 14:
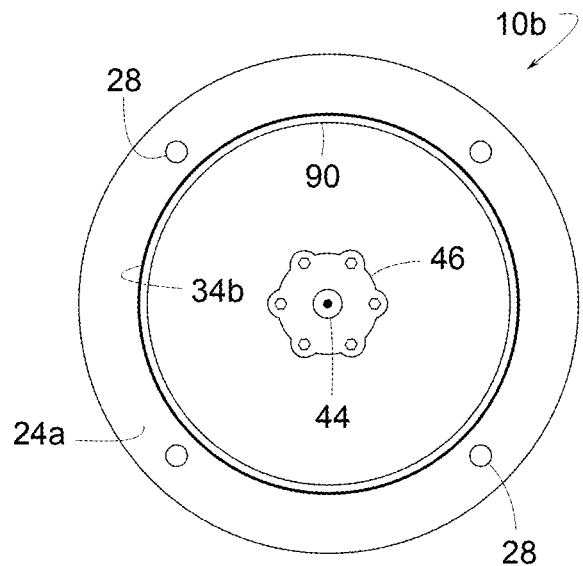
FIG. 14 is a cross-sectional view similar to FIG. 13 but showing an alternate example of the aerial valve.

In some examples, as shown in FIG. 14, the tubular diaphragm 34*b* of the aerial valve 10*b* is placed radially within the plurality of guide members 28 such that the plurality of guide members 28 at least partially surrounds the tubular diaphragm 34*b*. An annular mounting flange 90 (e.g., formed of angle iron) can be used to fasten the upper edge 36 of the tubular diaphragm 34*b* to the roof 24. With this design, the geometry of the mounting structure 60 is changed accordingly to achieve sealing engagement with the tubular diaphragm 34*b* when the aerial valve 10*b* is closed. This arrangement minimizes frictional drag between the tubular diaphragm 34*b* and the plurality of guide members 28 as the aerial valve 10*b* opens and closes.

Figure 13:
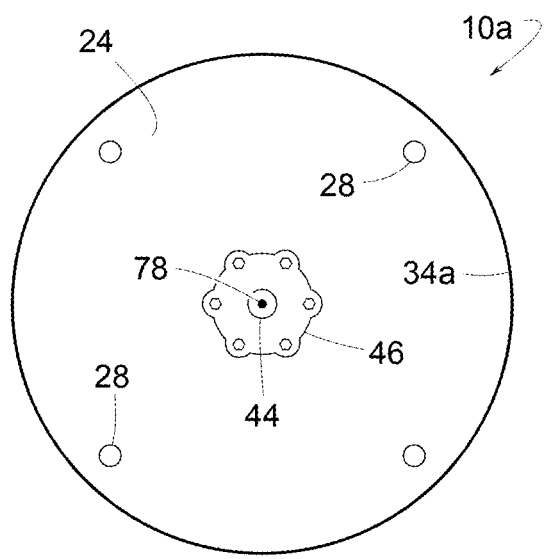
FIG. 13 is a cross-sectional view taken along line 13-13 of FIG. 10.
Figure 15:
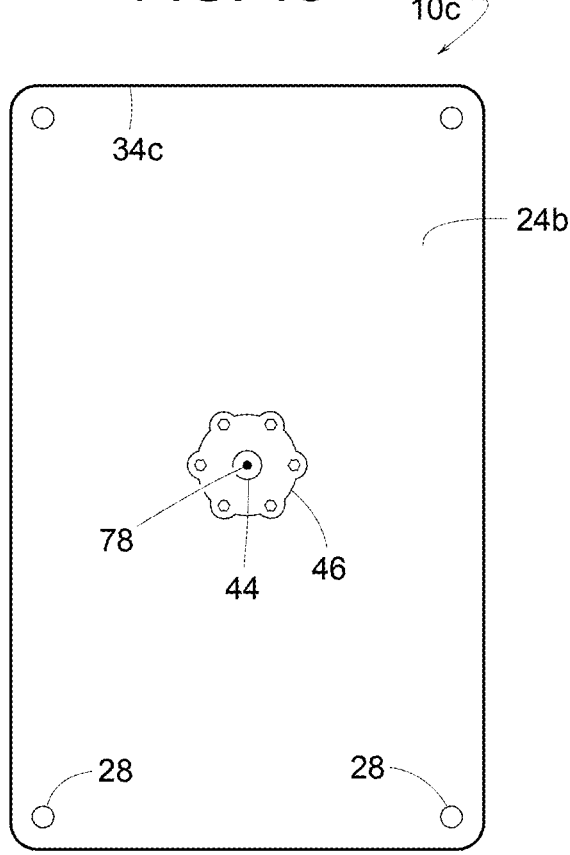
FIG. 15 is a cross-sectional view similar to FIG. 13 but showing another example of the aerial valve.

FIG. 15 is similar to FIG. 13 in that the tubular diaphragm 34*c* of the aerial valve 10*c* extends radially beyond the plurality of guide members 28 such that the tubular diaphragm 34*c* encircles the plurality of guide members 28. With aerial valve 10*c*, however, the roof 24*b* is oblong, e.g., a rounded square, a rounded rectangle, an ellipse, an oval, etc. This arrangement fits particularly well in applications where the aerial valve 10*c* is installed in the airplane 14*b*, shown in FIG. 2, as the airplane's body has a length greater than its width. With this design, the geometry of the mounting structure 60 is changed accordingly to achieve sealing engagement with the tubular diaphragm 34*c* when the aerial valve 10*c* is closed.

The example shown in FIG. 16 is similar to the one shown in FIG. 15 but with the tubular diaphragm 34*d* of the aerial valve 10*d* being placed radially within the plurality of guide members 28 such that the plurality of guide members 28 at least partially surrounds the tubular diaphragm 34*d*. An upper mounting flange 95 of suitable shape (e.g., a rounded rectangle formed of angle iron) can be used to fasten the upper edge 36 of the tubular diaphragm 34*d* to the roof 24*b*. With this design, the geometry of the mounting structure 60 is changed to achieve sealing engagement with the tubular diaphragm 34*d* when the aerial valve 10*d* is closed. This arrangement fits particularly well in the airplane 14*b* and minimizes frictional drag between the tubular diaphragm 34*d* and the plurality of guide members 28 as the aerial valve 10*d* opens and closes.

As mentioned earlier, some examples of the aerial valve 10 include the electric motor 50 and the motor circuit 58. In some examples, the electric motor 50 is a linear actuator connected to the flow stopper 26 without the need for a leadscrew coupling the electric motor 50 to the flow stopper 26.

Some examples of the electric motor 50 include a stepper motor, a servomotor, and a brushless DC motor. Such motors do not have commutator brushes, so they are relatively low maintenance and can be accurately controlled to rotate the leadscrew 44. In some examples, a rotor 92 of the electric motor 50 is a permanent magnet rotor with a stator 94 of the electric motor 50 being electronically switched to impart controlled rotation to the rotor 92.

In some examples, the motor circuit 58 includes a driver circuit 58*a* and a controller circuit 58*b*. The driver circuit 58*a* sends electrical current to the stator 94 in a proper waveform and timing appropriate for operating the electric motor 50. The controller circuit 58*b* sends electrical signals to the driver circuit 58*a* such that the driver circuit 58*a* runs the electric motor 50 as desired.

In some examples, the electric motor 50 and the motor circuit 58 operate in a closed-loop control scheme, wherein the motor circuit 58 receives feedback pertaining to rotor speed, rotor position, back EMF, and/or valve position. In some examples, the electric motor 50 and the motor circuit 58 operate in an open-loop control scheme, wherein motor circuit 58 counts electrical pulses (steps) sent to the stator 94.

Referring to FIG. 1, some examples of the aerial valve 10 include a remote controller 96 and a communication link 98. The term, "remote" refers to a separation distance of at least two meters. The communication link 98, of at least two meters long, connects the remote controller 96 in signal communication with the motor circuit 58, e.g., the controller circuit 58*b* of the motor circuit 58. The communication link 98 is schematically illustrated to represent any communication path between the remote controller 96 and the motor circuit 58. Some examples of the communication link 98 include an electrically conductive wire, fiber optic cable, and a wireless communication link (for conveying radio waves or other electromagnetic radiation).

The remote controller 96 is schematically illustrated to represent any means for enabling a user 100 (e.g., a pilot or crew member) to send user-selectable control signals 102 from within the aircraft 14 to the motor circuit 58 of the aerial valve 10. Some examples of the user-selectable control signals 102 include commands such as fully open the valve, fully close the valve, open the valve a certain percentage (e.g., 25%, 50%, 75%, etc.), and open the valve increasing over time.

Figure 3:
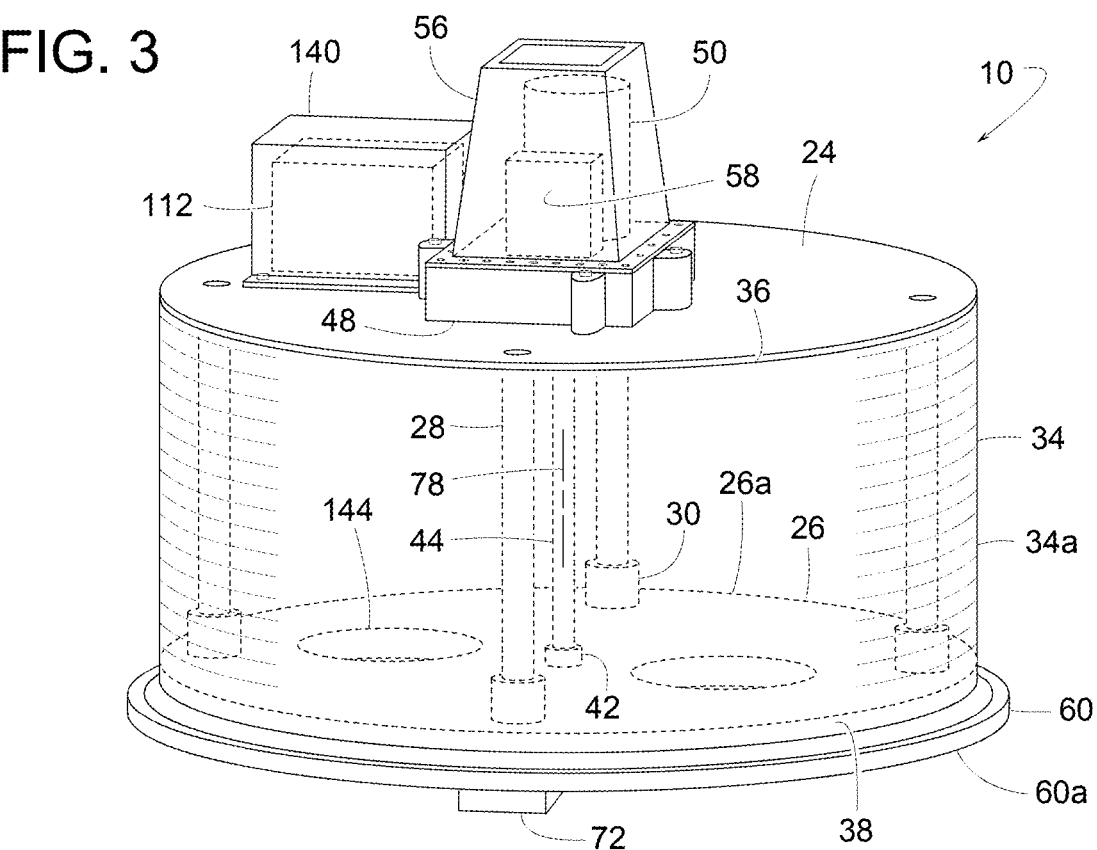
FIG. 3 is a perspective view of the aerial valve shown in FIGS. 1 and 2, wherein the aerial valve is shown in a fully closed position.
Figure 4:
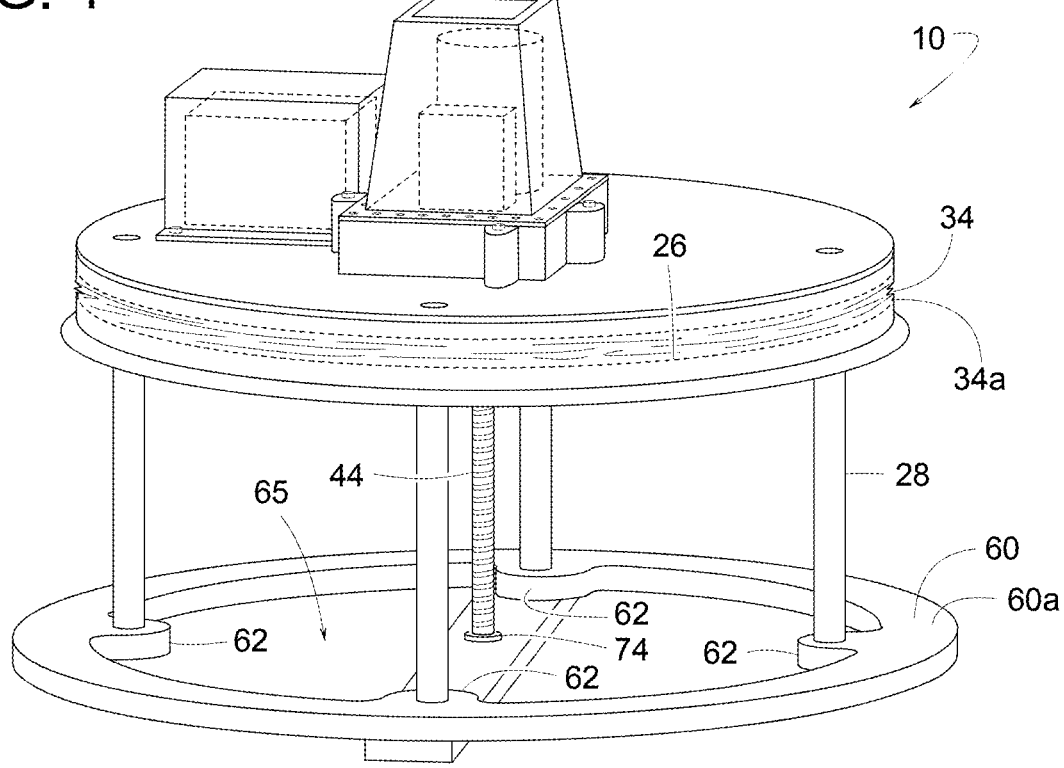
FIG. 4 is a perspective view similar to FIG. 3 but showing the aerial valve in a fully open position.
Figure 5:
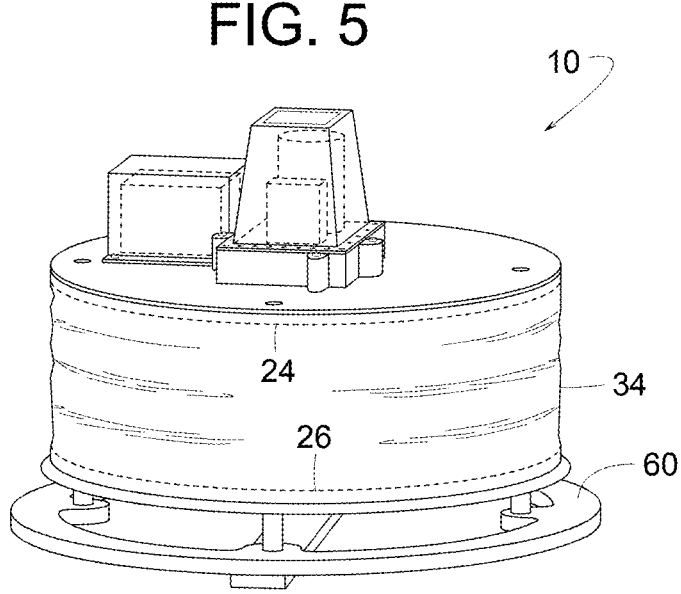
FIG. 5 is a perspective view similar to FIGS. 1 and 3 but showing the aerial valve at an intermediate open position.
Figure 6:
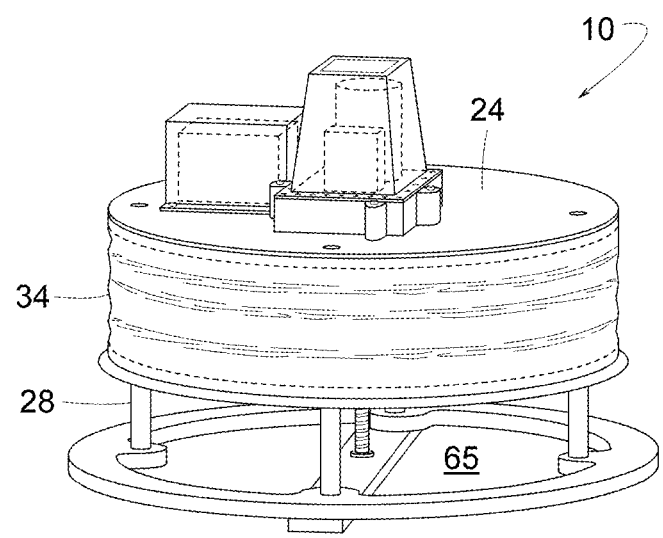
FIG. 6 is a perspective view similar to FIG. 5 but showing the aerial valve at another intermediate open position.

Some examples of the remote controller 96 have a plurality of discrete valve-opening settings 104 that are selectable by the user 100 in the aircraft 14. In some examples, the plurality of discrete valve-opening settings 104 determine a corresponding plurality of discrete intermediate positions (e.g., positions shown FIGS. 5-7) to which the motor circuit 58 commands the electric motor 50 to position the flow stopper 26 relative to the roof 24, wherein the corresponding plurality of discrete intermediate positions are between the fully raised position (FIG. 4) and the fully lowered position (FIG. 3).

Some examples of the remote controller 96 have a plurality of valve-opening program settings 106 that are selectable by the user 100 in the aircraft 14. In some examples, the plurality of valve-opening program settings 106 determine a corresponding plurality of valve opening functions in which the flow stopper 26 moves over a function of time relative to the roof 24. Some examples of the corresponding plurality of valve opening functions include, quickly open the valve over a reflectively short period of time, slowly open the valve over a relatively long period of time, and accelerate the opening of the valve over a predetermined period of time.

Some examples of the remote controller 96 include a computer, a laptop computer, a microprocessor, an integrated circuit, a PLC (programmable logic controller), a fob, a Color Message Interface, a Data Vault system, an FRDS (Gen III fire response dispersal system), a smartphone, a digital tablet, a handheld wireless transmitter and/or receiver, a hardwired transmitter and/or receiver, and various combinations thereof. The Color Message Interface, the Data Vault system, and the FRDS are products provided by Trotter Controls of Ft. Worth, Texas.

In some examples, a Wi-Fi communication link 108 is connected in signal communication with at least one of the motor circuit 58 and the remote controller 96 to convey an update signal 110 from the Internet to at least one of the motor circuit 58 and the remote controller 96. In some examples, the update signal 110 changes a control relationship between the plurality of discrete valve-opening settings 104 and the corresponding plurality of discrete intermediate positions of the flow stopper 26 relative to the roof 24. For example, one of the discrete valve-opening settings 104 originally set to open the aerial valve 25% could be changed to 33%.

In some examples, the update signal 110 changes a control relationship between the plurality of valve-opening program settings 106 and the corresponding plurality of valve opening functions. For example, one of the valve-opening program settings 106 originally set to quickly open the aerial valve 10 over a reflectively short period of time could be changed to open the valve 10 more slowly.

Some examples of the aerial valve 10 include a battery 112 supported by the roof 24. The battery 112 is connected to power the motor circuit 58 and the electric motor 50. In some examples, the remote controller 96 includes a first battery life indicator 114 that provides the user 100 with information on how much charge remains on the battery 112. The motor circuit 58 conveys the battery-life information to the remote controller 96 via the communication link 98.

In addition or alternatively, some examples of the motor circuit 58 include a second battery life indicator 116 that provides information as to how much life remains on the battery 112. In some examples, the second battery life indicator 116 is an LED light that the user 100 can see from the aircraft 14. In some examples, the LED light is green when there is sufficient battery life, and the LED light turns red when the battery charge drops below a certain limit. Having redundant battery life indicators 114 and 116 can be important in some aircraft applications.

In some examples, the LED light is visible through a see-through window 118 in the cover 56. In some examples, the LED light is visible by virtue of the cover 56 being made of a see-through polymeric material, such as polycarbonate or acrylic.

For ease of servicing, some examples of the aerial valve 10 are constructed as shown in FIG. 17. In some examples, a series of fasteners 120 secure the electric motor 50 to the motor base structure 48. In some examples, the motor circuit 58 is attached to the motor base structure 48 and/or to the electric motor 50. In some examples a series of fasteners 122 secure the cover 56 to the motor base structure 48. In some examples, a joint 124 between the cover 56 and the motor base structure 48 is sealed (e.g., via a gasket, an O-ring, an adhesive, etc.) to create a hermetic chamber 126 between the electric motor base structure 48 and the cover 56, thereby protecting the electric motor 50 and the motor circuit 58 from water damage.

In some examples, at least one fastener 128 (e.g., four screws) secures the motor base structure 48 to the roof 24. In some examples, the fastener 128 screws into a threaded insert 130 that is securely affixed to the roof 24. In some examples, the roof 24 is made of an aluminum alloy (e.g., 6061-T6) to minimize weight, while the threaded insert 130 is made of a material that is harder than the aluminum alloy. In some examples, the threaded insert 130 is made of steel or brass. In some examples, the threaded insert is a KEENSERT, which is a registered trademark of Howmet Aerospace Inc. of Pittsburgh, Pennsylvania.

The threaded insert 130 helps prevent the fastener 128 from stripping out internal threads that might otherwise be machined directly in the aluminum alloy of the roof 24. Alternatively, the threaded insert 130 eliminates the need for screwing the fastener 128 into a nut on the bottom side of the roof 24, so the threaded insert 130 allows assembly and disassembly with access to only one side of the roof 24.

Being able to readily remove the motor base structure 48 with access to just the top side of the roof 24 makes it easy and convenient to disconnect the disconnectable coupling 52 and thus separate the electric motor 50 from the leadscrew 44. In some examples, the disconnectable coupling 52 is a LOVEJOY jaw coupling comprising two metal hubs and an elastomer insert (known as an element or spider), wherein LOVEJOY is a registered trademark of The Timkin Company of Downers Grove, Illinois.

In some examples, the motor base structure 48 defines a sheltered cavity 132 for housing wiring 134 and/or wire connectors 136 that electrically couple the battery 112 to the motor circuit 58. In some examples, a wire connector 138 provides means for electrically disconnecting the battery 112 from the wiring 134 underneath the motor base structure 48.

In some examples, the battery 112 is sheltered in a waterproof enclosure 140. In some examples, a series of fasteners 142 secures the enclosure 140 to the roof 24.

In some examples, the flow stopper 26 includes one or more openings 144 (FIG. 3). The openings 144 help prevent adverse air pressure from developing between the roof 24 and the flow stopper 26 as the aerial valve 10 opens and closes. In some examples, the openings 144 provide clearance for attaching optional pumps to the underside of the roof 24. In some examples, such pumps can be used for pumping liquid 16 into the liquid container 12.

Some examples of the aerial valve 10e are constructed as shown in FIGS. 18-20. In some examples, the electric motor 50 is attached to the underside of the roof 24 to make the aerial valve 10e more compact. In such examples, the opening 144 provides clearance between the electric motor 50 and the flow stopper 26. When the aerial valve 10e is open, the electric motor 50 protrudes through the opening 144, as shown in FIG. 19.

In some examples, a drive mechanism 146 includes a timing loop device 148 that couples the electric motor 50 to the leadscrew 44. The term, "timing loop device" refers to any flexible or articulated ring with segments, teeth or cogs for coupling two rotatable elements in a controlled rotational relationship. Some examples of the timing loop device 148 include a timing belt, a metal timing chain, a cam belt, a cogged belt, a toothed polymeric belt, and a roller chain. In some examples, a cover 150 attached to the roof 24 shelters the drive mechanism 146 from the liquid 16 in the container 12.

The seal 40 can be mounted in any location that provides sealing between the flow stopper 26 and the mounting structure 60. In some examples, the seal 40 (e.g., seal 40b of FIGS. 21-24) is attached to the mounting structure 60 and comes in separable sealing contact with some portion of the flow stopper 26. In some examples, the seal 40 (e.g., seal 40a of FIGS. 8-12, and 17-20) is attached to the flow stopper 26 and comes in separable sealing contact with some portion of the mounting structure 60.

FIG. 20 shows how two or more aerial valves 10e can be installed in a relatively long tank 12b. Such tanks are common in airplanes 14b with an elongate fuselage.

FIGS. 21 and 22 show the aerial valve 10f with the liquid flow conditioner 152 attached to the flow stopper 26. The motor 50 rotates the leadscrew 44 to move the flow stopper 26 up and down, respectively opening and closing the aerial valve 10f in a manner similar to that of the aerial valve 10e. In this example, the seal 40b is attached to the mounting structure 60c. Such a seal location makes it easier to replace the seal 40b. A three spoke stabilizer bar 72a provides the leadscrew 44 with additional stability.

FIGS. 23 and 24 show the aerial valve 10g with the seal 40b attached to the mounting structure 60c by way of the retainer 66. FIG. 23 shows the aerial valve 10g closed, and FIG. 24 shows the aerial valve 10g open.

FIG. 25 shows the tank 12b carried inside the helicopter 14a with the aerial valve 10 installed at the bottom of the tank 12b. FIGS. 26 and 27 show the expandable tank 12c mounted to the underside of the helicopter 14a. FIG. 26 shows the expandable tank 12c empty and retracted. FIG. 27 shows the expandable tank 12c extended and filled with liquid 16. Expandable tanks are well known by those of ordinary skill in the art.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. An aerial valve for a liquid container carried by an aircraft,
   the aerial valve being selectively configurable to an open position and a closed position,
   the aerial valve comprising:
   a roof;
   a flow stopper being movable relative to the roof selectively to a raised position and a lowered position, the flow stopper being in the raised position when the aerial valve is in the open position, the flow stopper being in the lowered position when the aerial valve is in the closed position, the flow stopper being closer to the roof when the flow stopper is in the raised position than when the flow stopper is in the lowered position;

a plurality of guide members being connected to the roof, being elongate in an axial direction, and being connectable to the liquid container;

a plurality of traveling members on the flow stopper and being in traveling contact with the plurality of guide members to guide the flow stopper in the axial direction when the flow stopper moves between the lowered position and the raised position; and a tubular diaphragm having an upper edge and a lower edge, the upper edge being affixed to the roof, the lower edge being affixed to the flow stopper, the tubular diaphragm being axially collapsible such that the lower edge of the tubular diaphragm is closer to the upper edge when the flow stopper is in the raised position than when the flow stopper is in the lowered position, wherein the tubular diaphragm and the roof define an air chamber that is underneath the roof and at least partially surrounded by the tubular diaphragm when the flow stopper is in the lowered position.

2. The aerial valve of claim 1, wherein the liquid container includes a mounting structure, and the plurality of guide members are connectable to the liquid container via the mounting structure.

3. The aerial valve of claim 1, wherein at least a portion of the tubular diaphragm engages and slides along the plurality of guide members when the flow stopper moves between the lowered position and the raised position.

4. The aerial valve of claim 1, further comprising a protective patch on the tubular diaphragm, wherein the protective patch is in sliding contact with the plurality of guide members.

5. The aerial valve of claim 1, wherein the tubular diaphragm extends radially beyond the plurality of guide members such that the tubular diaphragm encircles the plurality of guide members.

6. The aerial valve of claim 1, wherein the tubular diaphragm is disposed radially within the plurality of guide members such that the plurality of guide members at least partially surround the tubular diaphragm.

7. The aerial valve of claim 1, wherein the liquid container includes a mounting structure with four lugs extending inward in a radial direction, wherein the radial direction is perpendicular to the axial direction and the plurality of guide members are connectable to the liquid container at the four lugs.

8. The aerial valve of claim 1, wherein the liquid container includes a mounting structure, the plurality of guide members are connectable to the liquid container via the mounting structure, and the aerial valve further comprising a stabilizer bar coupled to the plurality of guide members via the mounting structure such that the stabilizer bar is below the mounting structure when the plurality of guide members are connected to the liquid container, and the stabilizer bar is elongate in a radial direction perpendicular to the axial direction.

9. The aerial valve of claim 1, further comprising:
a leadscrew extending below the roof; and
a nut being supported by the flow stopper and threadingly engaging the leadscrew such that rotation of the leadscrew forces the flow stopper to move in the axial direction.

10. The aerial valve of claim 9, further comprising:
a motor base structure attached to the roof;
an electric motor attached to the motor base structure such that the motor base structure is between the electric motor and the roof; and
a disconnectable coupling underneath the motor base plate, the disconnectable coupling connecting the electric motor to the leadscrew.

11. The aerial valve of claim 9, further comprising:
a motor base structure attached to the roof;
a cover attached to the motor base plate, the cover and the motor base structure defining a hermetic chamber therebetween;
an electric motor contained within the hermetic chamber and being attached to the motor base structure such that the motor base structure is between the electric motor and the roof; and
a disconnectable coupling underneath the motor base plate, the disconnectable coupling connecting the electric motor to the leadscrew.

12. The aerial valve of claim 1, further comprising:
a motor base structure attached to the roof;
a cover attached to the motor base plate, the cover and the motor base structure defining a hermetic chamber therebetween, at least one of the motor base structure and the cover being made of a polymeric material; and
an electric motor contained within the hermetic chamber and being attached to the motor base structure such that the motor base structure is between the electric motor and the roof.

13. The aerial valve of claim 1, further comprising:
a motor base structure attached to the roof;
a cover attached to the motor base plate, the cover and the motor base structure defining a hermetic chamber therebetween, the cover includes a see-through window; and
an electric motor contained within the hermetic chamber and being attached to the motor base structure such that the motor base structure is between the electric motor and the roof.

14. The aerial valve of claim 1, wherein the roof includes an aluminum alloy, and the aerial valve further comprising:
a motor base plate;
a threaded insert in the roof, the threaded insert being harder than the aluminum alloy; and
a fastener screwed into the threaded insert to secure the motor base structure to the roof.

15. The aerial valve of claim 2, further comprising a seal on at least one of the tubular diaphragm and the flow stopper, the seal engaging the mounting structure when the flow stopper is in the lowered position, and the seal being spaced apart from the mounting structure when the flow stopper is in the raised position.

16. The aerial valve of claim 1, further comprising:
an electric motor coupled to the flow stopper to move the flow stopper between the lowered position and the raised position;
a motor circuit wired to the electric motor to operate the electric motor;
a battery supported by the roof and connected to power the motor circuit and the electric motor;
a remote controller in the aircraft;
a wireless communication link connecting the remote controller in signal communication with the motor circuit;

a first battery life indicator on the remote controller; and
a second battery life indicator wired to at least one of the battery and the motor circuit.

17. The aerial valve of claim 1, further comprising:
an electric motor coupled to the flow stopper to move the flow stopper between the lowered position and the raised position;
a motor drive wired to the electric motor to control the electric motor;
a battery supported by the roof and connected to power the motor circuit and the electric motor;
a remote controller accessible by a user in the aircraft;
a wireless communication link connecting the remote controller in signal communication with the motor circuit; and
the remote controller having a plurality of discrete valve-opening settings that are selectable by the user in the aircraft, the plurality of discrete valve-opening settings determining a corresponding plurality of discrete intermediate positions of the flow stopper relative to the roof, wherein the corresponding plurality of discrete intermediate positions are between the raised position and the lowered position.

18. The aerial valve of claim 17, further comprising: an update signal to change a control relationship between the plurality of discrete valve-opening settings and the corresponding plurality of discrete intermediate positions of the flow stopper relative to the roof; and a communication link being connected in signal communication with at least one of the motor circuit and the remote controller to convey the update signal to at least one of the motor circuit and the remote controller.

19. The aerial valve of claim 1, further comprising:
an electric motor coupled to the flow stopper to move the flow stopper between the lowered position and the raised position;
a motor circuit wired to the electric motor to control the electric motor;
a battery supported by the roof and connected to power the motor circuit and the electric motor;
a remote controller accessible by a user in the aircraft;
a wireless communication link connecting the remote controller in signal communication with the motor circuit; and
the remote controller having a plurality of valve-opening program settings that are selectable by the user in the aircraft, the plurality of valve-opening program settings determining a corresponding plurality of valve opening functions in which the flow stopper moves over a function of time relative to the roof.

20. The aerial valve of claim 19, further comprising: an update signal to change a control relationship between the plurality of valve-opening program settings and the corresponding plurality of valve opening functions; and a communication link being connected in signal communication with at least one of the motor circuit and the remote controller to convey the update signal to at least one of the motor circuit and the remote controller.

21. The aerial valve of claim 1, wherein the flow stopper defines an opening, and the aerial valve further comprises an electric motor attached to the roof and protruding through the opening when the flow stopper is in the raised position.

22. The aerial valve of claim 1, further comprising:
an electric motor attached to the roof;
a leadscrew extending below the roof;
a nut supported by the flow stopper and threadingly engaging the leadscrew; and
a timing loop device coupling the electric motor to the leadscrew.

23. The aerial valve of claim 2, further comprising a seal on the mounting structure, the seal engaging the flow stopper when the flow stopper is in the lowered position, and the seal being spaced apart from the flow stopper when the flow stopper is in the raised position.

\* \* \* \* \*